United States Patent
Wang et al.

(10) Patent No.: US 10,397,177 B2
(45) Date of Patent: Aug. 27, 2019

(54) MATTER MESSAGE NOTIFICATION METHOD, APPARATUS, AND DEVICE

(71) Applicant: Tencent Technology (Shenzhen) Company Limited, Shenzhen (CN)

(72) Inventors: Wentao Wang, Shenzhen (CN); Zhixing Chen, Shenzhen (CN); Kaikai Shi, Shenzhen (CN); Zhiping Han, Shenzhen (CN); Si Ye, Shenzhen (CN); Xiongzhi Li, Shenzhen (CN); Haolong Huang, Shenzhen (CN); Muxuan Huang, Shenzhen (CN); Jinlin Chen, Shenzhen (CN); Feng Liu, Shenzhen (CN); Pengfei Zhang, Shenzhen (CN); Di Luo, Shenzhen (CN); Ao Wei, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 0 days.

(21) Appl. No.: 15/721,879

(22) Filed: Sep. 30, 2017

(65) Prior Publication Data
US 2018/0026932 A1  Jan. 25, 2018

Related U.S. Application Data

(63) Continuation-in-part of application No. PCT/CN2016/101691, filed on Oct. 10, 2016.

(30) Foreign Application Priority Data

Oct. 10, 2016  (CN) .......................... 2015 1 0731462

(51) Int. Cl.
*H04L 12/58* (2006.01)
*H04L 29/08* (2006.01)
*H04W 68/04* (2009.01)
*H04W 68/12* (2009.01)
*H04W 4/21* (2018.01)

(52) U.S. Cl.
CPC .............. *H04L 51/38* (2013.01); *H04L 51/14* (2013.01); *H04L 51/24* (2013.01); *H04L 67/26* (2013.01);
(Continued)

(58) Field of Classification Search
CPC ......... H04L 51/38; H04L 67/26; H04L 51/14; H04L 51/24; H04W 4/21; H04W 68/12; H04W 68/04
See application file for complete search history.

(56) References Cited

U.S. PATENT DOCUMENTS 6,230,205 B1 * 5/2001 Garrity ................... H04L 29/06
709/204
6,745,237 B1 * 6/2004 Garrity ................... H04L 29/06
709/219

(Continued)

FOREIGN PATENT DOCUMENTS

CN   102497328 A    6/2012
CN   104079473 A   10/2014
(Continued)

OTHER PUBLICATIONS

Tencent Technology, ISRWO, PCT/CN2016/101691, dated Jan. 13, 2017, 10 pgs.

(Continued)

*Primary Examiner* — Mehmood B. Khan
(74) *Attorney, Agent, or Firm* — Morgan, Lewis & Bockius LLP

(57) ABSTRACT

The present disclosure discloses a subject matter message notification method performed at a terminal and to be disseminated to one or more target users. The method includes: displaying a subject matter editing interface, the subject matter editing interface including an editing item used for editing subject matter content, an editing item used
(Continued)

for adding a target user, and an editing item used for adding a file; generating a subject matter message in accordance with user-provided subject matter content through the editing item used for editing subject matter content, one or more user-selected target users through the editing item used for adding a target user, and one or more user-selected files through the editing item used for adding a file; and sending the subject matter message to a server, wherein the server is configured to send the subject matter message to the one or more user-selected target users.

17 Claims, 13 Drawing Sheets

(52) U.S. Cl.
CPC .............. *H04W 4/21* (2018.02); *H04W 68/04* (2013.01); *H04W 68/12* (2013.01)

(56) References Cited

U.S. PATENT DOCUMENTS

| | | | |
|---|---|---|---|
| 2004/0015548 A1* | 1/2004 | Lee | H04L 12/1827 709/204 |
| 2006/0294108 A1* | 12/2006 | Adelson | G06F 19/3456 |
| 2009/0011781 A1* | 1/2009 | Merrill | G06Q 30/02 455/466 |
| 2011/0212737 A1* | 9/2011 | Isidore | H04M 1/72519 455/466 |
| 2011/0286362 A1* | 11/2011 | Hulmani | H04L 47/10 370/259 |
| 2013/0218681 A1* | 8/2013 | Haney | H04W 4/21 705/14.58 |
| 2015/0312184 A1 | 10/2015 | Langholz et al. | |
| 2016/0239192 A1* | 8/2016 | Chiu | H04L 51/04 |
| 2016/0315887 A1* | 10/2016 | Uraizee | H04L 51/36 |
| 2017/0250006 A1* | 8/2017 | Ovalle | H04L 67/28 |

FOREIGN PATENT DOCUMENTS

| | | |
|---|---|---|
| CN | 104660483 A | 5/2015 |
| CN | 104899034 A | 9/2015 |
| CN | 105282013 A | 1/2016 |

OTHER PUBLICATIONS

Tencent Technology, IPRP, PCT/CN2016/101691, dated May 1, 2018, 8 pgs.

* cited by examiner

MATTER MESSAGE NOTIFICATION METHOD, APPARATUS, AND DEVICE

RELATED APPLICATIONS

This application is a continuation-in-part application of PCT/CN2016/101691, entitled "EVENT MESSAGE NOTIFICATION METHOD, APPARATUS AND DEVICE" filed on Oct. 10, 2016, which claims priority to Chinese Patent Application No. 201510731462.5, filed with the State Intellectual Property Office of the People's Republic of China on Oct. 30, 2015, and entitled "MATTER MESSAGE NOTIFICATION METHOD, APPARATUS, AND SYSTEM", both of which are incorporated herein by reference in their entirety.

FIELD OF THE TECHNOLOGY

Embodiments of the present disclosure relate to the field of computer technologies, and in particular, to a subject matter message notification method, apparatus, and device.

BACKGROUND OF THE DISCLOSURE

Matter notification is a common service notification requirement. A matter usually relates to relatively much content. Therefore, when some matters need to be notified to some people, a notifying party may notify a notified party of the details of the matters in an instant messaging manner. The notified party needs to open a chat interface with the notifying party, to receive multiple files or multiple texts that are sent by the notifying party.

Information sent by the notifying party needs to be received for many times to obtain an entire notified matter. Consequently, the notification efficiency is relatively poor.

SUMMARY

To resolve the technical problem of relatively poor notification efficiency in the existing technology due to that information sent by a notifying party needs to be received for many times to obtain an entire notified matter, embodiments of the present disclosure provide a subject matter message notification method and apparatus, and a device. The technical solutions are as follows.

According to a first aspect, a subject matter message notification method is provided. The method is applied to a transmit client, and includes: displaying a subject matter editing interface, the subject matter editing interface including an editing item used for editing subject matter content; obtaining a target user selected according to the editing item, and performing combination according to the target user and content edited by using another editing item, to obtain a subject matter message; and sending the subject matter message to a server, the subject matter message being used for triggering the server to send the subject matter message to the target user.

According to a second aspect, a subject matter message notification method is provided. The method is applied to a server, and includes: receiving a subject matter message sent by a transmit client; parsing the subject matter message to obtain a target user, the target user being a user that is selected by the transmit client and that needs to pay attention to the subject matter message; and sending the subject matter message to the target user, and instructing the target user to pay attention to the subject matter message.

According to a third aspect, a subject matter message notification method is provided. The method is applied to a receive client, and includes: receiving a subject matter message sent by a server, the subject matter message being obtained by a transmit client by means of combination according to editing items in a subject matter editing interface that are used for editing subject matter content, and being sent to a server; parsing the subject matter message; and displaying brief content of the subject matter message, the brief content including at least text content related to the subject matter message.

According to a fourth aspect, a subject matter message notification apparatus is provided. The apparatus is applied to a transmit client, and includes: a first display module, configured to display a subject matter editing interface, the subject matter editing interface including an editing item used for editing subject matter content; a combination module, configured to: obtain a target user selected according to the editing item, and perform combination according to the target user and content edited by using another editing item, to obtain a subject matter message; and a sending module, configured to send, to a server, the subject matter message obtained by the combination module by means of combination, the subject matter message being used for triggering the server to send the subject matter message to the target user.

According to a fifth aspect, a subject matter message notification apparatus is provided. The apparatus is applied to a server, and includes:

a receiving module, configured to receive a subject matter message sent by a transmit client; a parsing module, configured to parse the subject matter message received by the receiving module to obtain a target user, the target user being a user that is selected by the transmit client and that needs to pay attention to the subject matter message; and a sending module, configured to: send the subject matter message to the target user, and instruct the target user to pay attention to the subject matter message.

According to a sixth aspect, a subject matter message notification apparatus is provided. The apparatus is applied to a receive client, and includes: a receiving module, configured to receive a subject matter message sent by a server, the subject matter message being obtained by a transmit client by means of combination according to editing items in a subject matter editing interface that are used for editing subject matter content, and being sent to a server; a parsing module, configured to parse the subject matter message received by the receiving module; and a first display module, configured to display brief content of the subject matter message, the brief content including at least text content related to the subject matter message.

According to a seventh aspect, a first terminal is provided. The first terminal includes: one or more processors; and a memory, the memory storing one or more programs, the one or more programs being configured to be executed by the one or more processors, and the one or more programs including instructions for performing the following operations: displaying a subject matter editing interface, the subject matter editing interface including an editing item used for editing subject matter content; obtaining a target user selected according to the editing item, and performing combination according to the target user and content edited by using another editing item, to obtain a subject matter message; and sending the subject matter message to a server, the subject matter message being used for triggering the server to send the subject matter message to the target user.

According to an eighth aspect, a server is provided. The server includes: one or more processors; and a memory, the memory storing one or more programs, the one or more programs being configured to be executed by the one or more processors, and the one or more programs including instructions for performing the following operations: receiving a subject matter message sent by a transmit client; parsing the subject matter message to obtain a target user, the target user being a user that is selected by the transmit client and that needs to pay attention to the subject matter message; and sending the subject matter message to the target user, and instructing the target user to pay attention to the subject matter message.

According to a ninth aspect, a second terminal is provided. The second terminal includes: one or more processors; and a memory, the memory storing one or more programs, the one or more programs being configured to be executed by the one or more processors, and the one or more programs including instructions for performing the following operations: receiving a subject matter message sent by a server, the subject matter message being obtained by a transmit client by means of combination according to editing items in a subject matter editing interface that are used for editing subject matter content, and being sent to a server; parsing the subject matter message; and displaying brief content of the subject matter message, the brief content including at least text content related to the subject matter message.

According to a tenth aspect, a subject matter message notification system is provided. The system includes the first terminal described in the seventh aspect, the server described in the eighth aspect, and the second terminal described in the ninth aspect.

The beneficial effects brought by the technical solutions provided in the embodiments of the present disclosure are:

A subject matter message having rich media content is edited by using a subject matter editing interface, and the subject matter message is sent to a target user. Relatively much content can be notified by using one subject matter message. Therefore, a matter having relatively much content is notified by using one subject matter message, thereby improving the notification efficiency.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes implementation manners of the present disclosure in detail with reference to the accompanying drawings.

Figure 1:
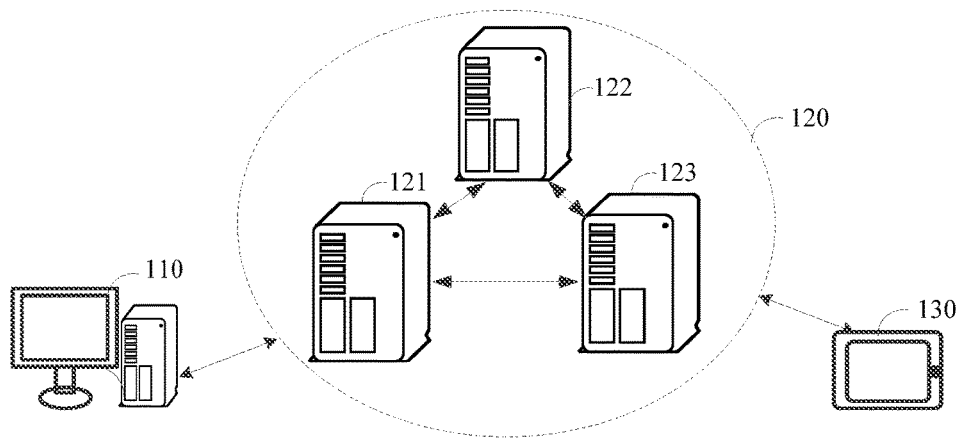
FIG. 1 is a schematic diagram of an implementation environment of a subject matter message notification method according to some embodiments of the present disclosure.

FIG. 1 is a schematic diagram of an implementation environment of a subject matter message notification method according to some embodiments of the present disclosure. The implementation environment may include a transmit client 110, a server 120, and at least one receive client 130.

The transmit client 110 may be an application program that is installed in a first terminal and that is logged in with an account. The transmit client 110 may be connected to the server 120 in the wired manner or the wireless manner.

The server 120 may be one server or a cluster of multiple servers. The multiple servers can interact with each other, and can interact with the transmit client 110 and the receive client 130.

Optionally, the server 120 may include a service server 121, a message server 122, and a file server 123. The service server 121 is separately connected to the message server 122 and the file server 123.

The service server 121 is responsible for processing service-related storage and operations. The message server 122 is configured to process message-related storage and operations. The file server 123 is configured to process operations such as file uploading, storage, and downloading.

The receive client 130 may be an application program that is installed in a second terminal and that is logged in with an account. The receive client 130 may be connected to the server 120 in the wired manner or the wireless manner.

The "first terminal" or the "second terminal" described herein may include a smartphone, a tablet computer, a smart television, an ebook reader, a multimedia player, a laptop portable computer, a desktop computer, or the like.

Figure 2A:
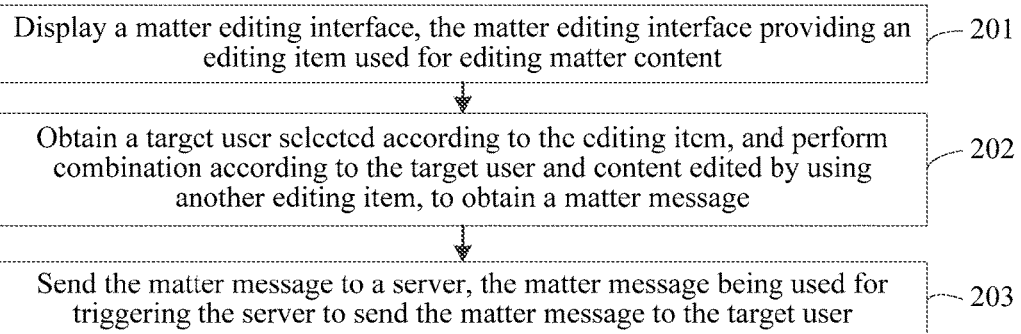
FIG. 2A is a flowchart of a subject matter message notification method according to some embodiments of the present disclosure.

FIG. 2A is a flowchart of a subject matter message notification method according to some embodiments of the present disclosure. The subject matter message notification method is applied to the transmit client 110 in the implementation environment shown in FIG. 1. The subject matter message notification method includes the following steps:

Operation 201: Display a subject matter editing interface, the subject matter editing interface including an editing item used for editing subject matter content.

Optionally, when the transmit client displays the subject matter editing interface, the method may include: presenting a subject matter editing entrance in an application program; and displaying the subject matter editing interface when the subject matter editing entrance is triggered. The application program described herein is an application program installed in the first terminal. When being logged in with an account, the first terminal is also referred to as a client, for example, the transmit client.

Optionally, when presenting the subject matter editing entrance in the application program, the transmit client may present the subject matter editing entrance in a group chat interface that is opened in the application program.

The subject matter editing entrance described herein is usually an entrance that is used for setting a matter and that is set in the receive client. For example, the subject matter editing entrance may be an application entrance of the group. Obviously, the subject matter editing entrance may not be an application entrance of the group but an independent application entrance of the application program.

Figure 2B:
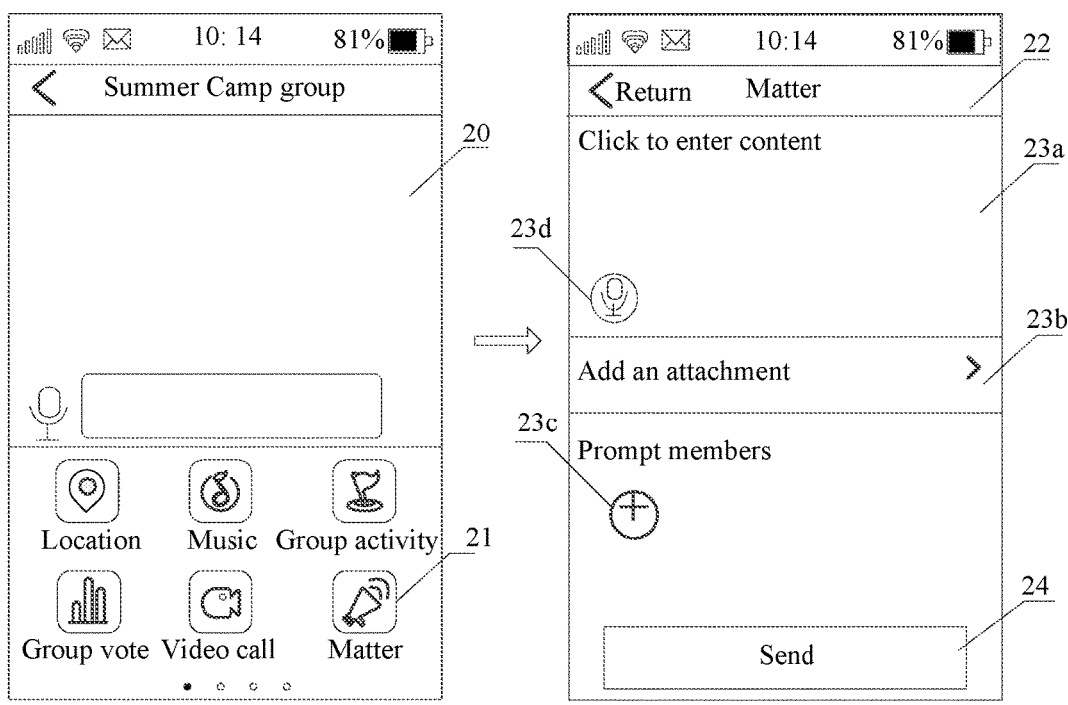
FIG. 2B is a schematic diagram of displaying a subject matter editing entrance and a subject matter editing interface in a group chat interface according to some embodiments of the present disclosure.

For example, when a group is currently opened in the receive client, a subject matter editing entrance in the group can be viewed in this case. After the subject matter editing entrance is triggered, the subject matter editing interface is entered. Referring to FIG. 2B, FIG. 2B is a schematic diagram of displaying a subject matter editing entrance and a subject matter editing interface in a group chat interface according to some embodiments of the present disclosure. In the left diagram of FIG. 2B, multiple group applications are displayed in a group chat interface 20. A displayed subject matter editing entrance 21 may be considered as an entrance of a group application of the group.

The editing item includes at least one of an editing item used for entering text information, an editing item used for adding a file, an editing item used for recording audio or a video, and an editing item used for adding a receive client.

A user may edit related content by using the editing item provided in the subject matter editing interface. The content is used for forming a matter.

For example, still referring to FIG. 2B, after the subject matter editing entrance 21 in the left diagram of FIG. 2B is triggered, a subject matter editing interface 22 in the right diagram is displayed. Multiple editing items, for example, an editing item 23a used for entering text information, an editing item 23b used for adding a file, an editing item 23c used for adding a receive client, and an editing item 23d used for recording audio or a video, are displayed in the subject matter editing interface 22.

Operation 202: Obtain a target user selected according to the editing item, and perform combination according to the target user and content edited by using another editing item, to obtain a subject matter message.

Optionally, when the subject matter message is obtained by means of combination according to the target user and the content edited by using the another editing item, the target user selected according to the editing item is obtained when a matter sending instruction is received, and the subject matter message is formed according to the target user, a group identifier, and the content edited by using the another editing item.

A sending control is usually set in the displayed subject matter editing interface. After completing the editing of the subject matter content by using the editing items, a user may trigger the sending control. In this case, the transmit client receives the matter sending instruction. For example, still referring to FIG. 2B, a sending control 24 is displayed in the subject matter editing interface 22.

When receiving the matter sending instruction, the transmit client combines the content edited in the editing items into the subject matter message. For example, text information in a text editing item, a file added in a file editing item, and an identifier of the added target user are combined into the subject matter message.

The identifier of the target user is usually information, for example, a user account of the target user, used for uniquely identifying the target user.

To enable the server to learn a group to which the subject matter message is sent, a group identifier may be further included during the combination of the subject matter message.

The group identifier is usually information, for example, a group number, used for uniquely identifying the group.

The group may include at least one user account. Any user account in the group can send information to other user accounts in the group. Each user account in the group can view information or a matter sent by another user account in the group.

Operation 203: Send the subject matter message to a server, the subject matter message being used for triggering the server to send the subject matter message to the target user. In some embodiments, the subject matter message is a read-only message for the target user. In other words, the target user can only open and read the subject matter message but cannot alter any portion of the subject matter message. By doing so, the organizer of the subject matter can control over the content of the subject matter message.

In some embodiments, an acknowledgement is received from the server for each target user after the target user acknowledges the receipt of the subject matter message (e.g., opening the subject matter message). For example, in response to the acknowledgement, a status of the corresponding target user is updated to indicate that the target user has received the subject matter message. Once all the target users have acknowledged the receipt of the subject matter message, a message may appear behind the subject matter message so that the organizer is aware of this fact.

In conclusion, by means of the subject matter message notification method provided in this embodiment of the present disclosure, the subject matter message having rich media content is edited by using the subject matter editing interface, and the subject matter message is sent to the target user. Relatively much content can be notified by using one subject matter message. Therefore, the technical problem of relatively poor notification efficiency in the related technology due to that information sent by a notifying party needs to be received for many times to obtain an entire notified matter is resolved, so that a matter having relatively much content can be notified by using one subject matter message, thereby improving the notification efficiency.

To facilitate a user of the transmit client to know which target user has viewed or paid attention to the subject matter message, when displaying the subject matter message that has been sent, the transmit client may display a confirmation result fed back by a receive client in a display area of the subject matter message. Generally, the confirmation result is used for indicating that the receive client sending the confirmation result has confirmed the subject matter message.

Figure 2C:
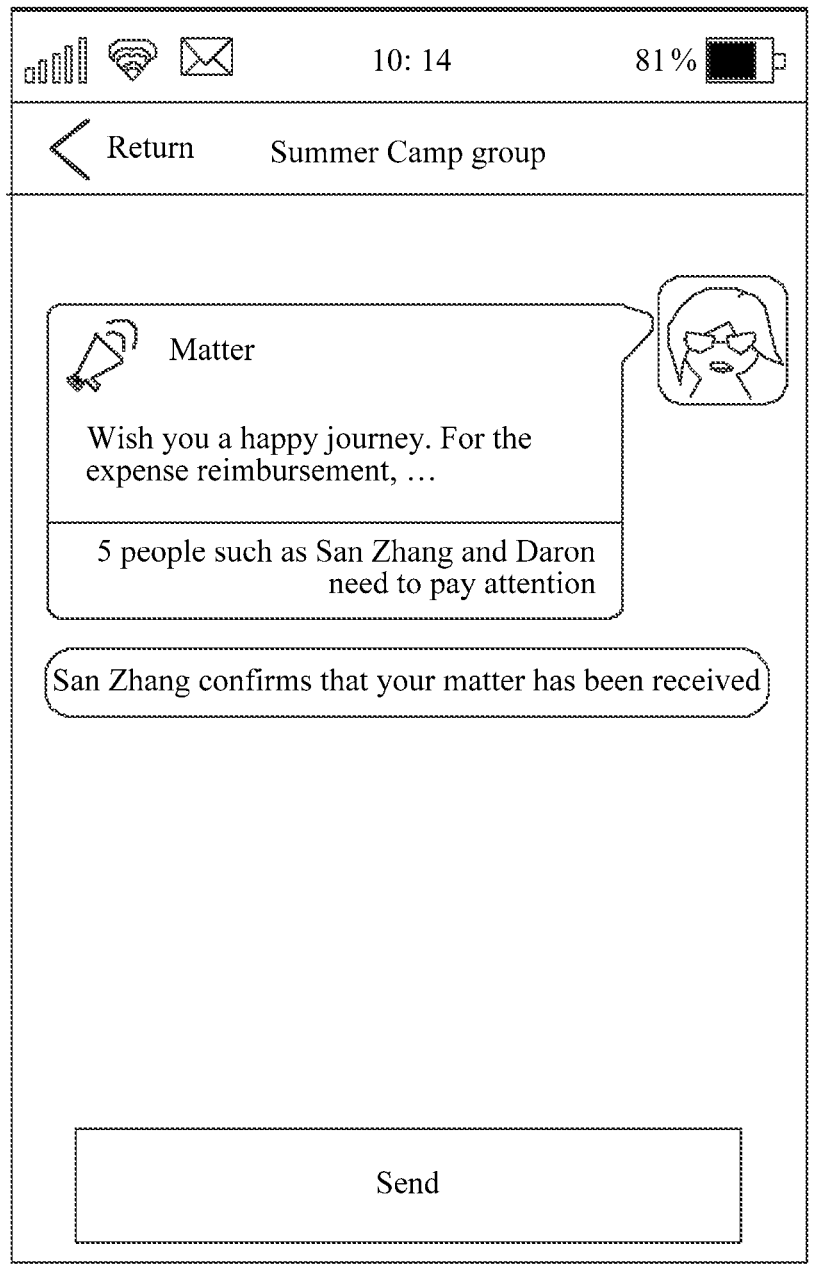
FIG. 2C is a schematic diagram of displaying a confirmation result according to some embodiments of the present disclosure.

Referring to FIG. 2C, FIG. 2C is a schematic diagram of displaying a confirmation result according to some embodiments of the present disclosure. After "Zhang San" sends a confirmation result, for example, "Zhang San confirms the reception of your matter" in FIG. 2C, for a subject matter message, the transmit client displays the confirmation result in the location of the subject matter message. Optionally, the "matter" in the displayed "Zhang San confirms the reception of your matter" may be a link used for displaying a corresponding subject matter message. When a user triggers the "matter" link, specific content of the subject matter message is displayed.

Figure 2D:
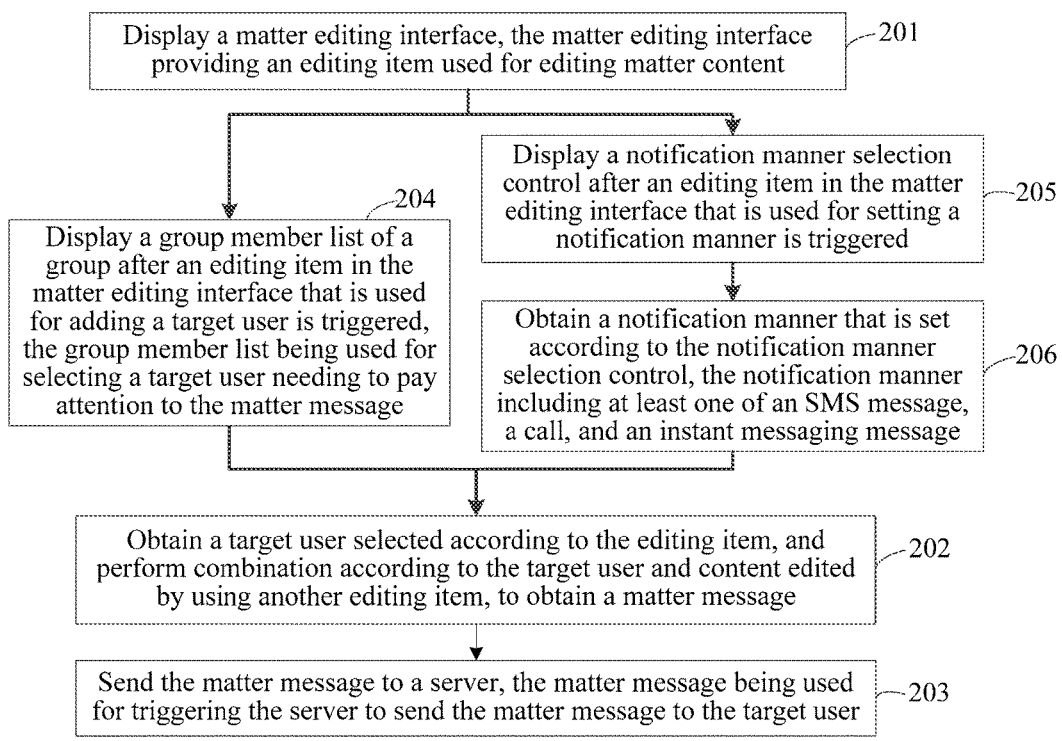
FIG. 2D is a flowchart of a subject matter message notification method according to another embodiment of the present disclosure.

During actual implementation, referring to FIG. 2D, when setting the content of the matter, the transmit client may select a notified user. That is, after operation 201, the subject matter message notification method further includes the following steps:

Operation 204: Display a group member list of a group after an editing item in the subject matter editing interface that is used for adding a target user is triggered, the group member list being used for selecting a target user needing to pay attention to the subject matter message.

After the editing item in the subject matter editing interface that is used for adding a receive client is triggered, members in the group are obtained, and the group member list of the group is displayed. The members in the group are displayed in the group member list. A user can select at least one target user for the subject matter message according to users in the group member list.

In an optional implementation manner, after the editing item in the subject matter editing interface that is used for adding a target user is triggered, and when the subject matter editing interface is not a subject matter editing interface of a group that is currently opened in the transmit client, a friend list of a user logging in to the transmit client is displayed, and a user selected according to the friend list is determined as the target user of the subject matter message. The subject matter message is sent to each target user in the chat message form. When the target user opens, in a logged client, a chat box with the user logging in to the transmit client, brief content of the subject matter message is displayed in the chat message form.

Usually, after the transmit client has selected the target user, an identifier of the target user may be carried in the subject matter message obtained by means of subsequent combination. In addition, when displaying the subject matter message, the transmit client displays the identifier of each selected target user.

In conclusion, by means of the subject matter message notification method provided in this embodiment of the present disclosure, the target user that can be selected by a user is determined by determining the subject matter editing entrance, and a user list that can be selected by the user is provided for the user, so as to facilitate the user to select the corresponding target user.

In a possible implementation manner, after the subject matter editing interface is displayed, the transmit client may further display a file directory after an editing item in the subject matter editing interface that is used for adding a file is triggered.

The file directory described herein is used for selecting at least one file needing to be added. The file directory includes at least one of a local file directory and a cloud file directory. The cloud file directory is a directory of files stored in a cloud server by a user logging in to the transmit client. Optionally, the displayed file directory may further include a quick entry of photographing. When the quick entry of photographing is triggered, a camera of a device in which the transmit client is located is turned on, an image acquired by the camera is automatically selected, and the image is used as an additional file of the matter when a user needs to add the image to the matter. The file directory is displayed, so that an additional file can be provided for the user, thereby simplifying an operation of adding a file to the matter by the user.

Still referring to FIG. 2D, the transmit client may further select a notification manner of the subject matter message when setting the content of the matter. That is, after operation 201, the subject matter message notification method further includes the following steps:

Operation 205: Display a notification manner selection control after an editing item in the subject matter editing interface that is used for setting a notification manner is triggered.

Operation 206: Obtain a notification manner that is set according to the notification manner selection control, the notification manner including at least one of an SMS message, a call, and an instant messaging message. Obviously, during actual application, the notification manner may alternatively be another manner such as the email manner. The notification manner is not limited in this embodiment. In some embodiments, the organizer of the subject matter message may choose different notification manners for different target users. For example, for users that may not always have an Internet connection, an automatic phone call or SMS message may be chosen for notifying those users while an instant messaging message may be used for other target users. In some embodiments, the organizer may choose more than one notification manner for a particular target user.

The execution sequence of operation 204 and operation 205 is not limited in this embodiment.

In conclusion, by means of the subject matter message notification method provided in this embodiment of the present disclosure, different notification manners are set, so as to achieve an asynchronous multi-channel notification capability, and ensure that a notified user can receive the subject matter message.

When sending the subject matter message to the server, the transmit client may selectively set the sending time of the subject matter message. That is, operation 203 may be replaced with the following two steps:

1: Display a sending-time setting control after a sending control used for guiding to send the subject matter message is triggered. The sending-time setting control may include an instant sending setting control and a delay sending setting control. When a user triggers the instant sending setting control, the transmit client directly sends the subject matter message to the server, and instructs the server to send the subject matter message to each receive client as soon as possible. When the delay sending setting control is triggered, a time setting option is displayed. The user sets the time of delay sending according to the time setting option, and the server is instructed to send the subject matter message to each receive client according to the set sending time.

2: Send, to the server, the subject matter message and the sending time that is set according to the sending-time setting control, the sending time being used for triggering the server to send the subject matter message to the receive client at the sending time. Optionally, the transmit client may send the subject matter message to the server according to the sending time. The server directly sends the subject matter message to the receive client. In this case, once receiving the subject matter message, the server sends the subject matter message to the receive client after successfully parsing the subject matter message, and does not need to determine the sending time.

In conclusion, by means of the subject matter message notification method provided in this embodiment of the present disclosure, the sending time of the subject matter message is set, so that the server sends the subject matter message to the receive client instantly or at the preset time. Therefore, the notification time of the subject matter message is set according to an actual notification requirement, so that the limitation of a notifier to the notification time is reduced, and the notifier can set the matter more flexibly.

After setting the content of the matter, the transmit client may further select to recall the subject matter message. That is, after operation 203, the subject matter message notification method further includes the following steps:

1: Display an ignore option corresponding to the subject matter message in a matter display list.

The matter display list described herein is used for displaying all subject matter messages received or sent by the transmit client or all subject matter messages related to a group that is currently opened by the transmit client. When being displayed in the matter display list, each subject matter message may be concisely presented according to a preset presentation template.

When displaying the ignore option corresponding to the subject matter message, the transmit client may first receive a trigger instruction used for triggering the subject matter message in a preset triggering manner, and display the ignore option corresponding to the subject matter message after receiving the triggering instruction.

2: Move the subject matter message corresponding to the ignore option into an ignored-matter list after the ignore option is triggered, the ignored-matter list including a subject matter message that is selected by a user to be ignored.

Figure 2E:
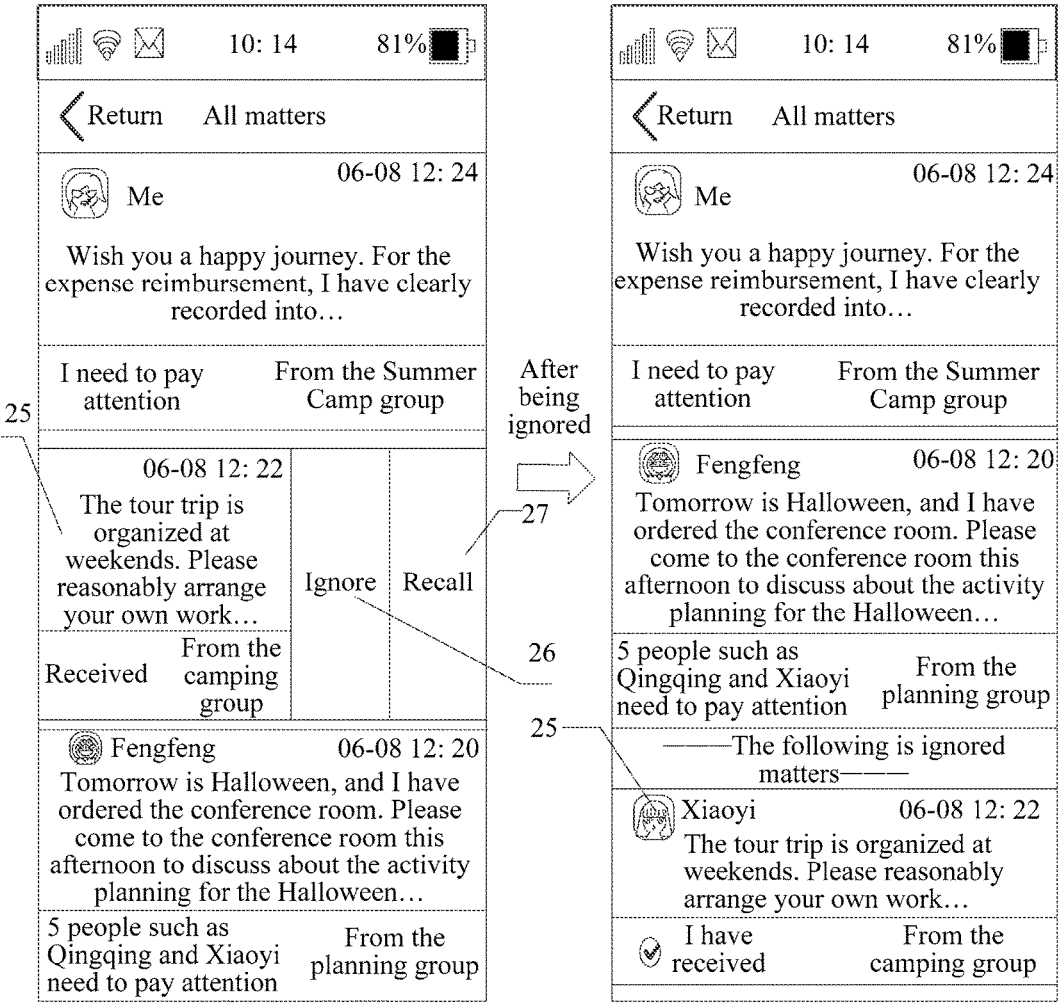
FIG. 2E is a schematic diagram when an ignored subject matter message is moved according to another embodiment of the present disclosure.

Referring to FIG. 2E, FIG. 2E is a schematic diagram when an ignored subject matter message is moved according to some embodiments of the present disclosure. A user slides a subject matter message 25 leftwards, in this case, an ignore option 26 is displayed on the right of the subject matter message. After the ignore option 26 is triggered, the transmit client moves the subject matter message into an ignored-matter list.

In a possible implementation manner, when the ignore option is displayed, a recall option corresponding to the subject matter message is further displayed. Still referring to FIG. 2E, when the ignore option 26 corresponding to the subject matter message is displayed, a recall option 27 is further displayed.

During actual implementation, when the specific content of the matter is viewed, the recall option may be directly displayed in a matter display interface. After the recall option is triggered, a recall message used for recalling the subject matter message is sent to the server. The recall message is used for triggering the server to: instruct the receive client of the subject matter message to recall displaying of the subject matter message, and return a recall result to the transmit client after the receive client successfully recalls the displaying of the subject matter message.

The transmit client receives the recall result, and displays the subject matter message in a recalled-matter list in the matter display interface. Optionally, when receiving the recall result, the transmit client displays the recall result in a chat box of the group.

In the common subject matter message setting process, a file related to a matter is usually set. In this case, an editing item used for adding a local file is further displayed in the subject matter editing interface. After a user triggers the editing item, a transmit client automatically displays a list of files that are locally stored in a first terminal and that can be added. The user can select at least one file for uploading. Optionally, after the user selects a file, to reduce the time and costs of setting the matter, the transmit client directly uploads the file selected by the user to the server when determining that the current network is a wireless local area network WiFi (full name: Wireless Fidelity) based on the IEEE 802.11b standard. For example, the file is uploaded to a file server, and the file server stores the file. In the process of uploading a relatively large file to the server, the uploading progress may be further displayed correspondingly.

The type of files is not limited in this embodiment. Optionally, during actual implementation, the number and the size of uploaded files can be limited, thereby avoiding the situation that a subject matter message cannot be successfully sent due to that there are excessive files or a file is excessively large. Optionally, a file uploaded by the user can be further deleted. For example, a deletion button is displayed in the location of a successfully uploaded file. When the user triggers the deletion button, the transmit client sends, to the server, a deletion request used for requesting to delete a file corresponding to the deletion button. The deletion request is used for triggering the server to: delete the already stored file, and return a deletion success reply to the transmit client after successfully deleting the file. The transmit client further deletes the displayed file. Optionally, the uploaded file may be named and sorted in a particular naming manner including, for example, a suffix used for indicating the file type.

Figure 3A:
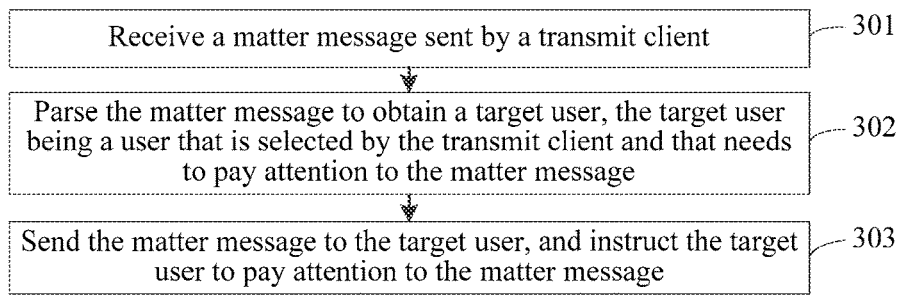
FIG. 3A is a flowchart of a subject matter message notification method according to still another embodiment of the present disclosure.

FIG. 3A is a flowchart of a subject matter message notification method according to still another embodiment of the present disclosure. The subject matter message notification method is applied to the sending server 120 in the implementation environment shown in FIG. 1. The subject matter message notification method includes the following steps:

Operation 301: Receive a subject matter message sent by a transmit client.

The subject matter message is sent after being edited by the transmit client. The subject matter message may include at least one of text information, audio information video information, and a file. Optionally, the subject matter message may further carry a specified target user.

Operation 302: Parse the subject matter message to obtain a target user, the target user being a user that is selected by the transmit client and that needs to pay attention to the subject matter message.

When setting the subject matter message, the transmit client may usually specify a target user in a group. Therefore, the subject matter message may usually carry the specified target user. Corresponding, the server can parse the subject matter message to obtain the specified target user.

Optionally, when setting the subject matter message, the transmit client may form the subject matter message in a group. In this case, the subject matter message may carry a group identifier of the group. When the subject matter message is parsed, the group identifier can be further obtained by means of parsing. The server may determine a group having the group identifier.

Operation 303: Send the subject matter message to the target user, and instruct the target user to pay attention to the subject matter message.

If the subject matter message is not specific to a group but to the selected target user, in this case, the server directly sends the subject matter message to the target user, and instructs the target user to pay attention to the subject matter message.

Optionally, if the subject matter message is specific to a group, when sending the subject matter message to the target user, the server may send the subject matter message to clients logged in by members in the group, and instruct the target user to pay attention to the subject matter message.

In conclusion, by means of the subject matter message notification method provided in this embodiment of the present disclosure, the subject matter message sent by the transmit client is sent to a specified group in the chat message form. A subject matter message having rich media content can be sent in the chat message form. Therefore, the technical problem of pretty low notification efficiency in the related technology due to relatively poor instantaneity of emails when a matter is notified in the email manner is resolved, so that a matter is instantly notified in the chat message form by using a group in an instant messaging application, thereby improving the notification efficiency.

During actual application, the transmit client may instruct a notification manner of sending the subject matter message. The server needs to send the subject matter message to a receive client in the notification manner. Operation 303 is replaced with the following steps:

1: Parse the subject matter message to obtain a notification manner. The notification manner described herein may include at least one of an SMS message, a call, an instant messaging message, and an email.

2: Generate a particular text message when the notification manner is an SMS message, and send the particular text message to an SMS message gateway, the particular text message including a link address of storing the subject matter message by the server.

An SMS message is usually in the pure text form, but a subject matter message usually includes at least one type of rich media content: a text, audio, a video, and a file. Therefore, to ensure that the receive client can receive and view entire content of the subject matter message, a link address may be set for the subject matter message, and the link address is added to the particular text message corresponding to the subject matter message. The server sends the particular text message to the SMS message gateway. At last, the SMS message gateway may send the particular text message to a second terminal of the target user. When the second terminal receives the particular text message in the SMS message form, the user may click the link address in the particular text message, to open a display interface of the content of the subject matter message. The display interface displays all the content of the subject matter message.

3: Generate a particular voice message related to the subject matter message when the notification manner is a call, call the target user in the calling manner, and play the particular voice message when the call to the target user is connected. The particular voice message related to the subject matter message may include content such as the names of the transmit client and the receive client or the theme of the subject matter message.

4: Send the subject matter message to the receive client to which the target user logs in when the notification manner is an instant messaging message. When the notification manner is the instant messaging message, the subject matter message is sent as an instant messaging message to the receive client.

The subject matter message is parsed in the notification manner, and the subject matter message is sent in the notification manner, so as to ensure that the subject matter message can be sent to the receive client in the manner specified by the transmit client.

Figure 3B:
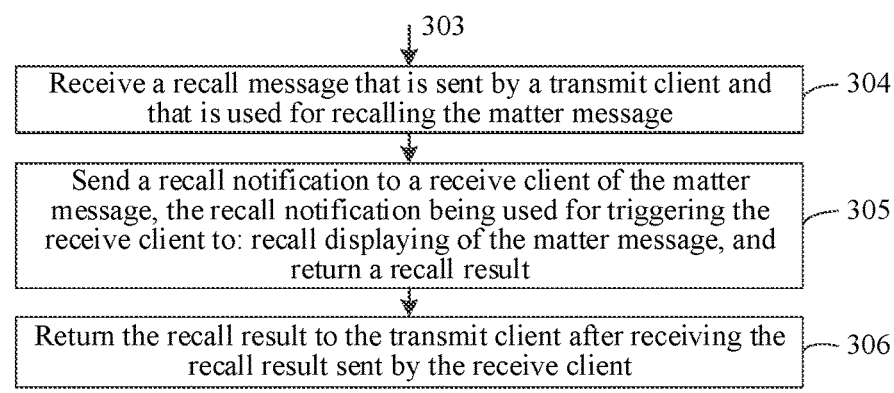
FIG. 3B is a flowchart of a subject matter message notification method according to still another embodiment of the present disclosure.

During actual application, the transmit client may request to recall a subject matter message. In this case, the server needs to instruct the receive client to recall displaying of the requested subject matter message. Referring to FIG. 3B, after operation 303, the subject matter message notification method may further include the following steps:

Operation 304: Receive a recall message that is sent by a transmit client and that is used for recalling the subject matter message.

Operation 305: Send a recall notification to the receive client of the subject matter message, the recall notification being used for triggering a receive client to: recall displaying of the subject matter message, and return a recall result.

Operation 306: Return the recall result to the transmit client after receiving the recall result sent by the receive client.

In conclusion, by means of the subject matter message notification method provided in this embodiment of the present disclosure, after the recall message is received, the recall notification is sent to the receive client, so as to facilitate the receive client to recall the displayed subject matter message according to the recall notification, thereby ensuring successful recalling of the displayed subject matter message in the receive client.

In a possible implementation manner, for a subject matter message sent in a group, members in the group can all see the subject matter message, but only a receive client specified by the transmit client can perform a confirmation operation on the subject matter message. In this case, when the server performs operation 303, the following steps may be further included: 1: Add a confirmation tag to the subject matter message that is to be sent to the target user, the confirmation tag being used for prompting the target user to pay attention to the subject matter message. 2: Send, to a client to which the target user logs in, the subject matter message added with the confirmation tag. 3: Send, to a client to which another user in the group logs in, the subject matter message not added with the confirmation tag.

That is, when sending the subject matter message to a member in the group, the server may determine, according to whether the member is the target user, whether to add the confirmation tag to the sent subject matter message; and if the member is the target user, add the confirmation tag to the subject matter message that is to be sent to the target user;

or if the member is not the target user, not add the confirmation tag to the subject matter message that is to be sent to the non-target user. It can be learned that the subject matter message sent by the server to a client to which the target user logs in carries the confirmation tag while the subject matter message sent by the server to a client to which the non-target user logs in does not carry the confirmation tag.

Figure 4A:
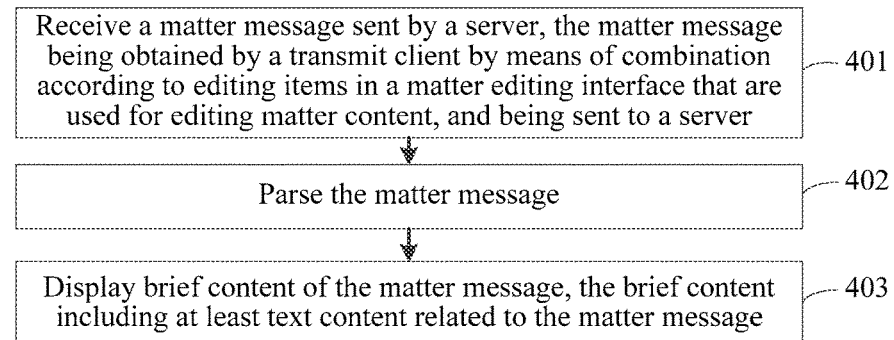
FIG. 4A is a flowchart of a subject matter message notification method according to still another embodiment of the present disclosure.

FIG. 4A is a flowchart of a subject matter message notification method according to still another embodiment of the present disclosure. The subject matter message notification method is applied to the receive client 130 in the implementation environment shown in FIG. 1. The subject matter message notification method includes the following steps:

Operation 401: Receive a subject matter message sent by a server, the subject matter message being obtained by a transmit client by means of combination according to editing items in a subject matter editing interface that are used for editing subject matter content, and being sent to a server.

Operation 402: Parse the subject matter message.

Optionally, if the subject matter message is specific for a group, a group identifier corresponding to the subject matter message can be obtained when the subject matter message is parsed.

Operation 403: Display brief content of the subject matter message, the brief content including at least text content related to the subject matter message.

Optionally, if the subject matter message is specific to a group, when displaying the brief content of the subject matter message, the receive client displays the brief content of the subject matter message in the chat message form in a group chat interface of a group having the group identifier.

In conclusion, by means of the subject matter message notification method provided in this embodiment of the present disclosure, the subject matter message sent by the server is received, and the brief content of the subject matter message is displayed in the chat message form in the group corresponding to the subject matter message. The subject matter message can be displayed in the chat message form, so as to ensure that displaying of other information in the group is not affected during displaying of the matter. In addition, the matter is presented in the chat message form in a group chat interface. Therefore, the technical problem of pretty low notification efficiency in the related technology due to relatively poor instantaneity of emails when a matter is notified in the email manner is resolved, so that the matter can be viewed instantly, thereby improving the matter notification efficiency.

Figure 4B:
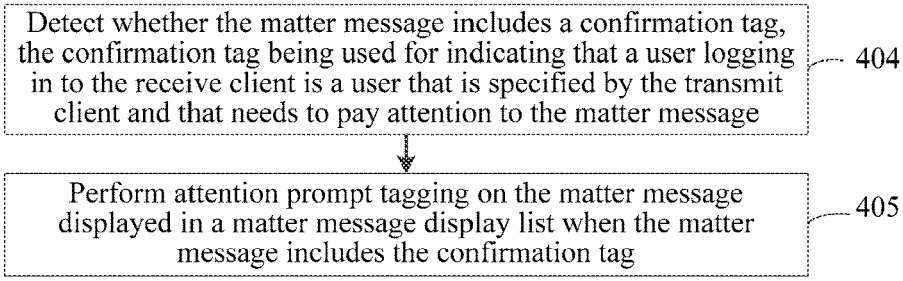
FIG. 4B is a flowchart of a subject matter message notification method according to still another embodiment of the present disclosure.

During actual application, when displaying the content of the subject matter message, the receive client may additionally display a confirmation control by using a confirmation tag carried in the subject matter message for the user to read and confirm the subject matter message. Referring to FIG. 4B, the subject matter message notification method may further include the following steps:

Operation 404: Detect whether the subject matter message includes a confirmation tag, the confirmation tag being used for indicating that a user logging in to the receive client is a user that is specified by the transmit client and that needs to pay attention to the subject matter message.

The confirmation tag herein is a confirmation tag added to the subject matter message that is sent to the receive client after the server determines that the subject matter message is a subject matter message corresponding to a group and the subject matter message specifies the receive client.

Operation 405: Perform attention prompt tagging on the subject matter message displayed in a subject matter message display list when the subject matter message includes the confirmation tag.

Figure 4C:
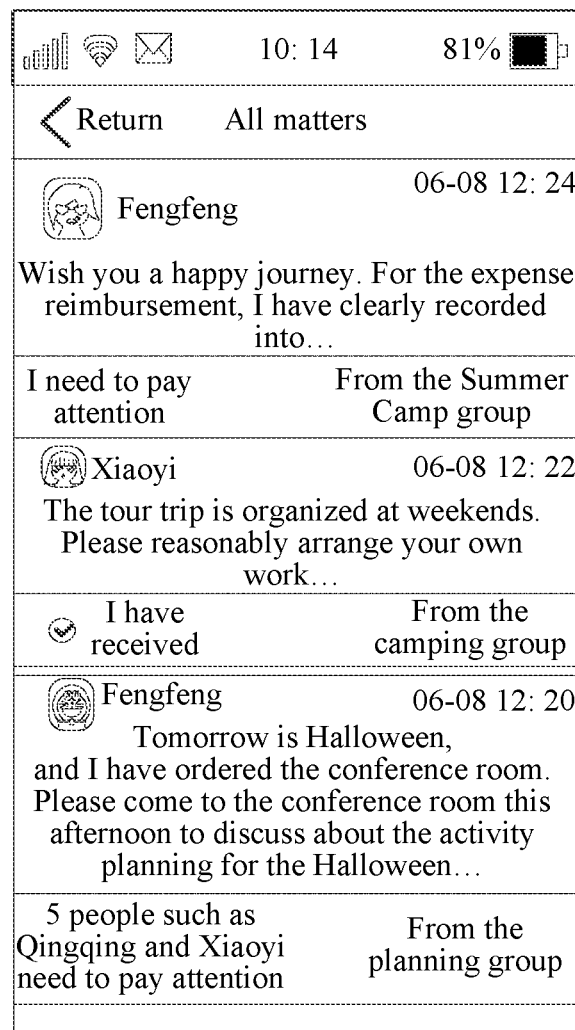
FIG. 4C is a schematic diagram of a subject matter message display list according to some embodiments of the present disclosure.

The subject matter message display list described herein includes received subject matter messages. As shown in FIG. 4C, in the subject matter message display list, the first subject matter message is added with a tag "I need to pay attention".

Optionally, when the subject matter message includes the confirmation tag, a confirmation control is displayed in a matter display interface of the subject matter message. After the confirmation control is triggered, the receive client may return a confirmation result to the transmit client.

Figure 4D:
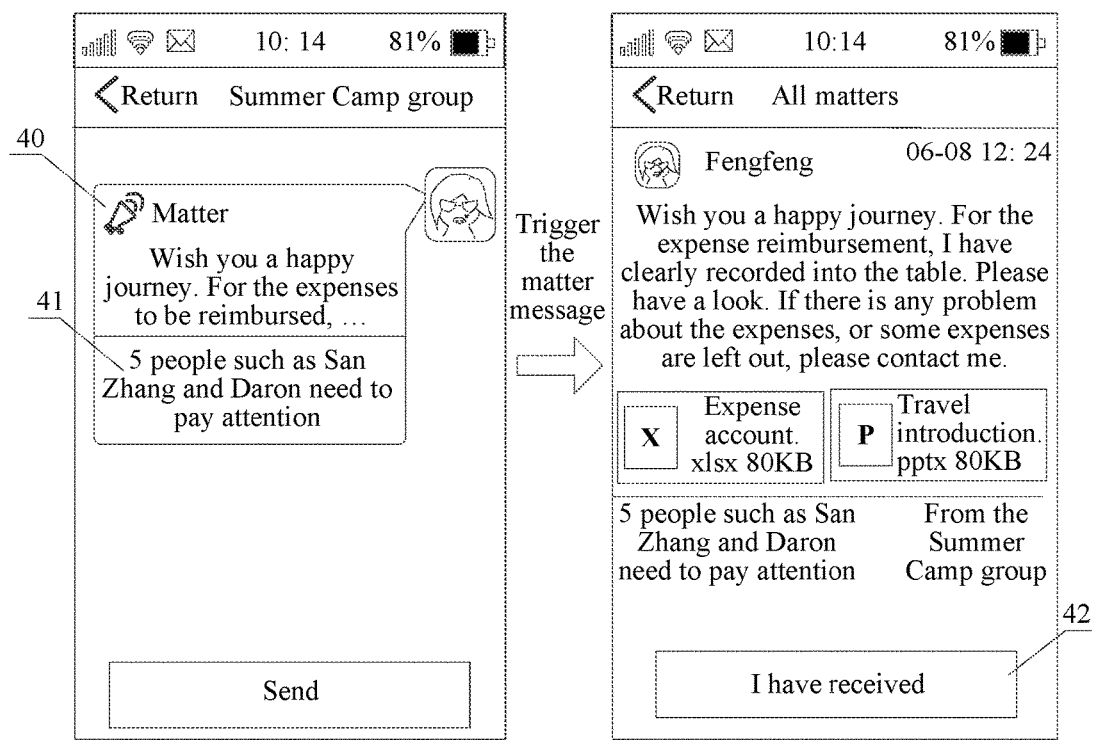
FIG. 4D is a schematic diagram of a matter display interface in a receive client according to some embodiments of the present disclosure.

Referring to FIG. 4D, FIG. 4D is a schematic diagram of a matter display interface in a receive client according to some embodiments of the present disclosure. In FIG. 4D, brief content 40 of a subject matter message is displayed in a group "Summer Camp group". In addition to the displayed theme and notified content of the matter, the brief content 40 of the subject matter message may further include a target user 41 needing to pay attention to. When a user triggers the brief content 40 of the subject matter message, detailed content of the subject matter message can be displayed. If a user logging in to the client is a specified target user of the subject matter message, a confirmation control 42 may be further displayed when the content of the subject matter message 40 is displayed.

Optionally, when determining that the subject matter message includes the confirmation tag, the receive client may further display the confirmation control on the brief content of the subject matter message. The user may directly trigger the confirmation control on the brief content. After the conformation control is triggered, the receive client may return a confirmation result to the transmit client.

In conclusion, by means of the subject matter message notification method provided in this embodiment of the present disclosure, when it is determined that there is the confirmation tag in the subject matter message, the attention prompt tagging is performed on the subject matter message in the subject matter message display list, so as to effectively prompt the user to instantly view the matter, thereby improving the instantaneity of matter prompt.

During actual application, the transmit client may request to recall a subject matter message, in this case, the server needs to instruct the receive client to recall displaying of the requested subject matter message. After operation 403, the subject matter message notification method may further include the following steps:

1: Display an ignore option corresponding to the subject matter message in a subject matter message display list.

A preset triggering manner described herein may be sliding leftwards or sliding rightwards. Obviously, another sliding manner may be used for implementation. The preset triggering manner is not limited in this embodiment. Optionally, in the subject matter message display list, when the subject matter message is triggered in the preset triggering manner, the ignore option corresponding to the subject matter message is displayed.

2: Move the subject matter message into an ignored-matter list after the ignore option is triggered, the ignored-matter list including a subject matter message that is selected by a user to be ignored.

Figure 4E:
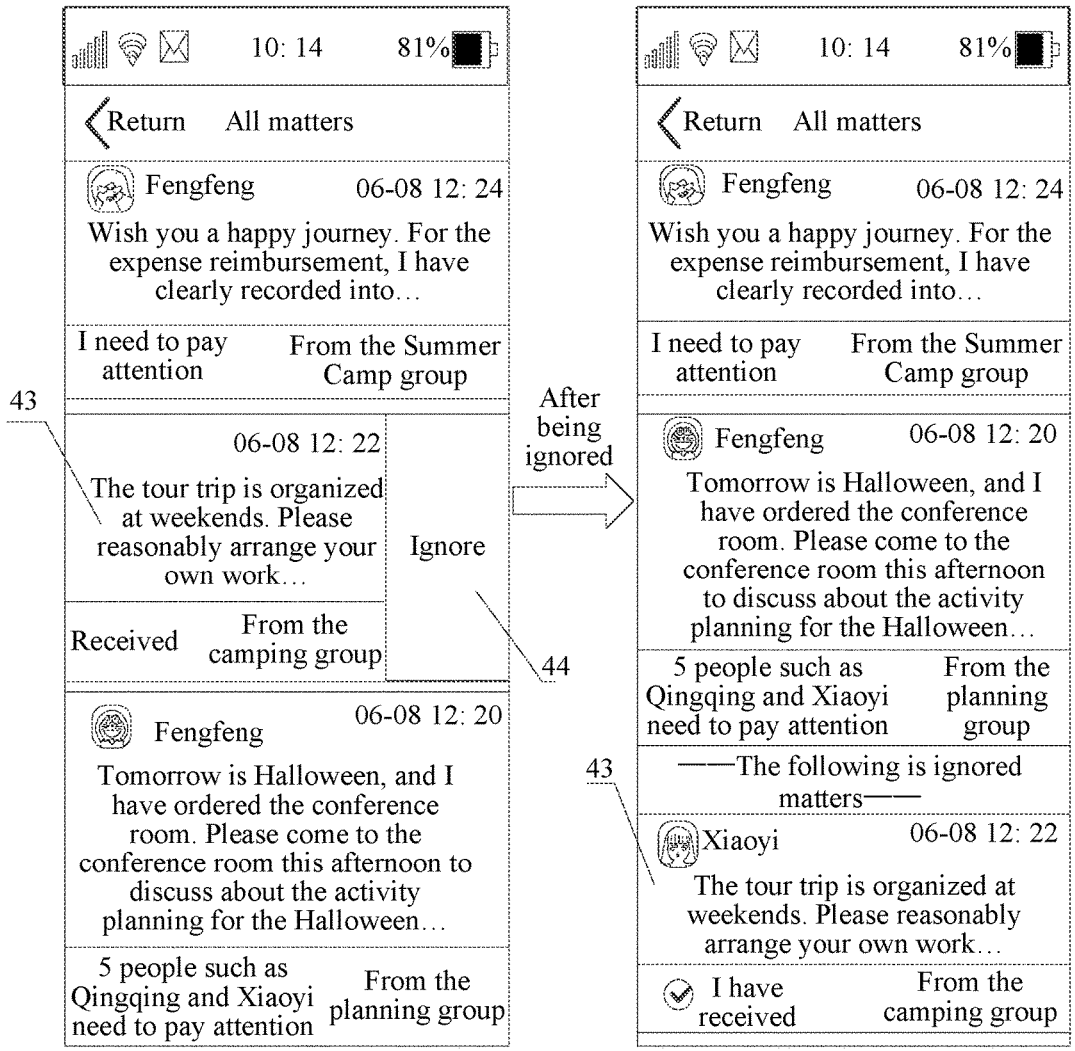
FIG. 4E is a schematic diagram when an ignored subject matter message is moved according to another embodiment of the present disclosure.

Referring to FIG. 4E, in a subject matter message display list, when a user slides a subject matter message 43 leftwards, the receive client may display an ignore option 44 corresponding to the subject matter message 43. After the ignore option 44 is triggered, the subject matter message is moved into an ignored-matter sub-list of the subject matter message display list.

After the ignore option is triggered, the subject matter message corresponding to the ignore option is moved into the ignored-matter list. In this way, matters that are selected to be ignored can be consolidated together, so that the layout impact of the ignored matters on non-ignored matters is reduced, thereby more facilitating a user to view the non-ignored matters.

In a possible implementation manner, the receive client may further recall, according to a recall notification of the server, a subject matter message that has been displayed. After operation 403, the subject matter message notification method may further include the following steps: receiving a recall notification that is sent by the server and that is used for instructing to recall a specified subject matter message; recalling displaying of the subject matter message, and sending a recall result to the server, the recall result being used for triggering the server to return the recall result to the transmit client. After the recall notification is received, the displayed subject matter message is recalled, and the recall result is fed back to the server. The server returns the recall result to the transmit client, so as to ensure that the displayed subject matter message in the receive client is successfully recalled and a recall success tag is displayed in the transmit client.

During actual application, the server 120 in the implementation environment shown in FIG. 1 may be a cluster of multiple servers such as a file server 123, a message server 122, and a service server 121. The process of implementing subject matter message notification by using multiple servers is specifically described below with reference to FIG. 5.

Figure 5:
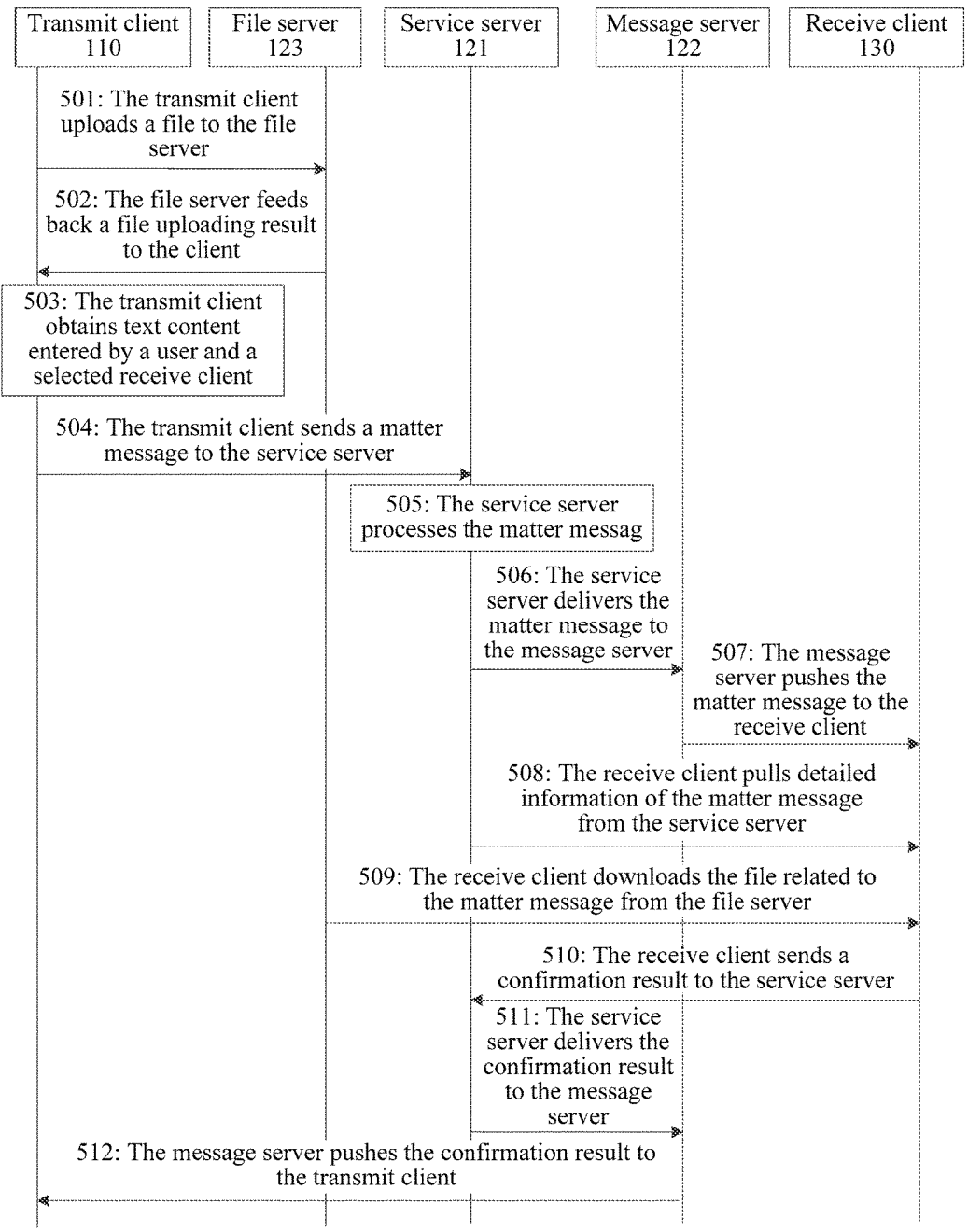
FIG. 5 is a flowchart of a subject matter message notification method according to still another embodiment of the present disclosure.

FIG. 5 is a flowchart of a subject matter message notification method according to still another embodiment of the present disclosure. The subject matter message notification method is applied to the implementation environment shown in FIG. 1. The subject matter message notification method includes the following steps:

Operation 501: A transmit client uploads a file to a file server. The file herein is a local file added by using an editing item in a subject matter editing interface that is used for adding a file.

Operation 502: The file server returns a file uploading result to the client.

Operation 503: The transmit client obtains text content entered by a user and a selected receive client.

The text content herein is edited by the user by using an editing item in the subject matter editing interface that is used for editing text content. The receive client herein may be understood as a target user, and is added by the user by using an editing item in the subject matter editing interface that is used for adding a target user.

Operation 504: The transmit client sends a subject matter message to a service server.

The subject matter message herein is formed by using information such as the text content and the receive client (that is, a target user) that are obtained in step 503 and an identifier of the uploaded file in step 501.

Operation 505: The service server processes the subject matter message.

When the service server processes the subject matter message, operations include, but are not limited to, encoding, decoding, or the like.

Operation 506: The service server delivers the subject matter message to a message server.

After the service server delivers the subject matter message to the message server, the message server can parse the mater message to obtain the receive client. The subject matter message delivered to the message server herein may be brief information, general information of the subject matter content, the subject name, or the like.

Operation 507: The message server pushes the subject matter message to the receive client.

The subject matter message pushed to the receive client herein may be brief information, general information of the subject matter content, the subject name, or the like.

Operation 508: The receive client pulls detailed information of the subject matter message from the service server.

Operation 509: The receive client downloads the file related to the subject matter message from the file server.

When pulling the detailed information of the subject matter message and learning that the subject matter message includes the file in step 508, the receive client may request, according to an identifier of the file, the file server to download the corresponding file.

The process of pushing and displaying the subject matter message is completed by means of step 501 to step 508.

Operation 510: The receive client sends a confirmation result to the service server.

After obtaining the detailed information of the subject matter message, the receive client may further display a corresponding confirmation control when displaying the detailed information. When a user triggers the confirmation control, the receive client generates the confirmation result corresponding to the subject matter message.

Operation 511: The service server delivers the confirmation result to the message server.

Operation 512: The message server pushes the confirmation result to the transmit client.

In conclusion, by means of the subject matter message notification method provided in this embodiment of the present disclosure, a message having rich media content is edited by using a subject matter editing interface. In addition, a confirmation result can be displayed in a transmit client after the message is viewed and confirmed by a receive client. The transmit client can learn which notified clients have viewed the subject matter message. Therefore, the technical problem in the related technology that the notification efficiency is reduced due to that the notified parties that have viewed the matter are counted depending on message replies of the notified parties, causing inaccurate statistics is resolved, so that users that have viewed the subject matter message can be accurately counted, thereby improving the notification efficiency.

Figure 6:
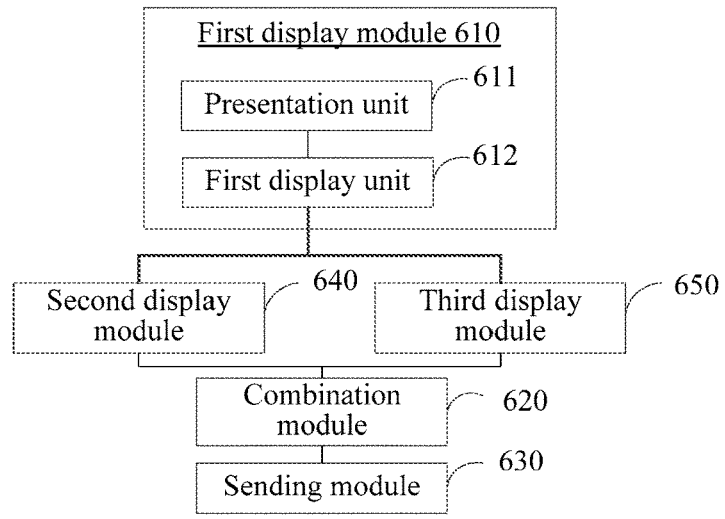
FIG. 6 is a schematic structural diagram of a subject matter message notification apparatus according to some embodiments of the present disclosure.

FIG. 6 is a schematic structural diagram of a subject matter message notification apparatus according to some embodiments of the present disclosure. The subject matter message notification apparatus is applied to the transmit client 110 in the implementation environment shown in FIG. 1. The subject matter message notification apparatus includes: a first display module 610, a combination module 620, and a sending module 630.

The first display module 610 is configured to display a subject matter editing interface, the subject matter editing interface including an editing item used for editing subject matter content.

The combination module 620 is configured to: obtain a target user selected according to the editing item, and perform combination according to the target user and content edited by using another editing item, to obtain a subject matter message.

The sending module 630 is configured to send, to a server, the subject matter message obtained by the combination module 620 by means of combination, the subject matter message being used for triggering the server to send the subject matter message to the target user.

Optionally, the first display module 610 includes:

a presentation unit 611, configured to present a subject matter editing entrance in an application program; and a first display unit 612, configured to display the subject matter editing interface after the subject matter editing entrance is triggered.

Optionally, the apparatus further includes:

a second display module 640, configured to: display a notification manner selection control after an editing item in the subject matter editing interface that is used for setting a notification manner is triggered; and obtain a notification manner that is set according to the notification manner selection control, the notification manner including at least one of an SMS message, a call, and an instant messaging message; and a third display module 650, configured to display a file directory after an editing item in the subject matter editing interface that is used for adding a file is triggered, the file directory being used for selecting at least one file needing to be added, and the file directory including at least one of a local file directory and a cloud file directory.

Optionally, the editing item includes at least one of an editing item used for entering text information, an editing item used for adding a file, an editing item used for recording audio or a video, and an editing item used for adding a target user.

Optionally, the sending module 630 includes:

a second display unit, configured to display a sending-time setting control after a sending control used for guiding to send the subject matter message is triggered; and a sending unit, configured to send, to the server, the subject matter message and the sending time that is set according to the sending-time setting control, the sending time being used for triggering the server to send the subject matter message to the target user at the sending time.

Optionally, the apparatus further includes: a fourth display module, configured to display a group member list of a group after an editing item in the subject matter editing interface that is used for adding a target user is triggered, the group member list being used for selecting a target user needing to pay attention to the subject matter message.

Optionally, the combination module 620 is further configured to form the subject matter message according to the target user, a group identifier, and the content edited by using the another editing item, the subject matter message being used for triggering the server to: send the subject matter message to clients to which members in the group log in, and notify the target user to pay attention to the subject matter message.

Optionally, the presentation unit 611 is further configured to present the subject matter editing entrance in a group chat interface that is opened in the application program.

Optionally, the subject matter message notification apparatus is further configured to: receive a recall instruction of recalling a selected subject matter message that has been sent, and send, to the server, a recall message for instructing to recall the selected subject matter message, the recall message being used for triggering the server to: instruct a receive client of the subject matter message to recall displaying of the subject matter message, and return a recall result to the transmit client after the receive client successfully recalls the displaying of the subject matter message.

In conclusion, by means of the subject matter message notification apparatus provided in this embodiment of the present disclosure, a subject matter message having rich media content is edited by using a subject matter editing interface, and the subject matter message is sent to a target user. Relatively much content can be notified by using one subject matter message. Therefore, the problem of relatively poor notification efficiency in the related technology due to that information sent by a notifying party needs to be received for many times to obtain an entire notified matter is resolved, so that a matter having relatively much content can be notified by using one subject matter message, thereby improving the notification efficiency.

Figure 7:
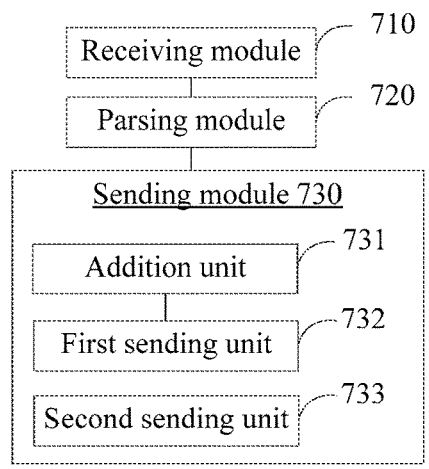
FIG. 7 is a schematic structural diagram of a subject matter message notification apparatus according to another embodiment of the present disclosure.

FIG. 7 is a schematic structural diagram of a subject matter message notification apparatus according to another embodiment of the present disclosure. The subject matter message notification apparatus is applied to the server 120 in the implementation environment shown in FIG. 1. The subject matter message notification apparatus includes: a receiving module 710, a parsing module 720, and a sending module 730.

The receiving module 710 is configured to receive a subject matter message sent by a transmit client.

The parsing module 720 is configured to parse the subject matter message received by the receiving module 710 to obtain a target user, the target user being a user that is selected by the transmit client and that needs to pay attention to the subject matter message.

The sending module 730 is configured to: send the subject matter message to the target user, and instruct the target user to pay attention to the subject matter message.

Optionally, the subject matter message further includes a group identifier. The parsing module 720 is further configured to: parse the subject matter message to obtain the group identifier; and determine a group having the group identifier.

The sending module 730 is further configured to:

send the subject matter message to clients to which members in the group log in, and instruct the target user to pay attention to the subject matter message.

Optionally, the sending module 730 includes: an addition unit 731, and a first sending unit 732 or a second sending unit 733.

The addition unit 731 is configured to add a confirmation tag to the subject matter message that is to be sent the target user, the confirmation tag being used for prompting the target user to pay attention to the subject matter message. The first sending unit 732 is configured to send, to a client to which the target user logs in, the subject matter message added with the confirmation tag. The second sending unit 733 is configured to send, to a client to which another member in the group logs in, the subject matter message not added with the confirmation tag.

Optionally, the subject matter message notification apparatus is further configured to: receive a recall message that is used for recalling the subject matter message and that is sent by the transmit client; send a recall notification to a receive client of the subject matter message, the recall notification being used for triggering the receive client to: recall displaying of the subject matter message, and return a recall result; and return the recall result to the transmit client after receiving the recall result sent by the receive client.

In conclusion, by means of the subject matter message notification apparatus provided in this embodiment of the present disclosure, a subject matter message sent by a transmit client is sent to a specified target user. The subject matter message having rich media content can be sent in the form of one message. Therefore, the problem of relatively poor notification efficiency in the related technology due to that information sent by a notifying party needs to be received for many times to obtain an entire notified matter is resolved, so that a matter having relatively much content can be notified by using one subject matter message, thereby improving the notification efficiency.

Figure 8:
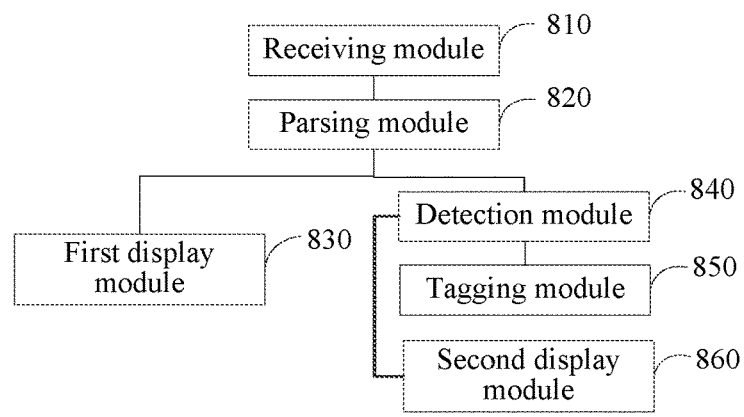
FIG. 8 is a schematic structural diagram of a subject matter message notification apparatus according to still another embodiment of the present disclosure.

FIG. 8 is a schematic structural diagram of a subject matter message notification apparatus according to still another embodiment of the present disclosure. The subject matter message notification apparatus is applied to the receive client 130 in the implementation environment shown in FIG. 1. The subject matter message notification apparatus includes: a receiving module 810, a parsing module 820, and a first display module 830.

The receiving module 810 is configured to receive a subject matter message sent by a server, the subject matter message being obtained by a transmit client by means of combination according to editing items in a subject matter editing interface that are used for editing subject matter content, and being sent to a server. The parsing module 820 is configured to parse the subject matter message received by the receiving module 810. The first display module 830 is configured to display brief content of the subject matter message, the brief content including at least text content related to the subject matter message.

Optionally, the parsing module 820 is further configured to: parse the subject matter message, to obtain a group identifier corresponding to the subject matter message.

The first display module 830 is further configured to: display the brief content of the subject matter message in the chat message form in a group chat interface having the group identifier.

Optionally, the apparatus further includes: a detection module 840, configured to detect whether the subject matter message includes a confirmation tag, the confirmation tag being used for indicating that a user logging in to the receive client is a user that is specified by the transmit client and that needs to pay attention to the subject matter message; and a tagging module 850, configured to perform attention prompt tagging on the subject matter message displayed in a subject matter message display list when the detection module 840 detects that the subject matter message includes the confirmation tag.

Optionally, the apparatus further includes: a second display module 860, configured to display a confirmation control on the brief content of the subject matter message or on a matter display interface of the subject matter message when the subject matter message includes the confirmation tag. The receive client may return a confirmation result to the transmit client after the confirmation control is triggered.

In conclusion, by means of the subject matter message notification apparatus provided in this embodiment of the present disclosure, the problem of pretty low notification efficiency in the related technology due to the relatively poor instantaneity of emails when a matter is notified in the email manner, so that the matter can be viewed instantly, thereby improving the notification efficiency.

It should be noted that the above functional modules are only described for exemplary purposes when the subject matter message notification apparatus provided in the foregoing embodiments notifies a subject matter message. In actual applications, the functions may be allocated to different functional modules according to specific needs, which means that the internal structures of the transmit client, the server, and the receive client are divided into different functional modules to complete all or some of the above described functions. In addition, the subject matter message notification apparatus provided in the foregoing embodiments are based on the same concept as the subject matter message notification method in the foregoing embodiments. For the specific implementation process, refer to the method embodiments, and the details are not described herein again.

An embodiment of the present disclosure further provides a subject matter message notification system. The system includes a transmit client, a server, and at least one receive client. The transmit client includes the subject matter message notification apparatus described in various possible implementation manners shown in FIG. 6. The server includes the subject matter message notification apparatus described in various possible implementation manners shown in FIG. 7. The receive client includes the subject matter message notification apparatus described in various possible implementation manners shown in FIG. 8. Specifically, refer to the description in FIG. 6 to FIG. 8, and details are not described herein again.

Figure 9:
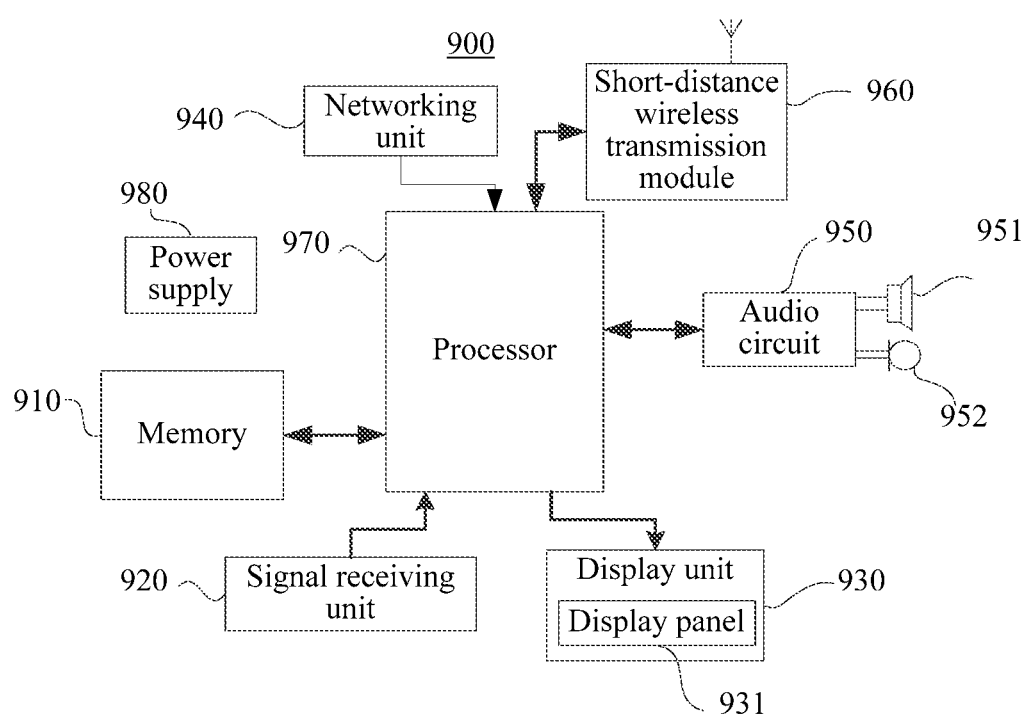
FIG. 9 is a schematic structural diagram of a terminal according to some embodiments of the present disclosure.

FIG. 9 is a schematic structural diagram of a terminal according to some embodiments of the present disclosure. The terminal 900 may be a smartphone, a desktop computer, another intelligent device that can be installed with an instant messaging application program, or the like. Details are as follows.

The terminal 900 may include components such as a memory 910 including one or more computer readable storage mediums, a signal receiving unit 920, a display unit 930, a networking unit 940, an audio circuit 950, a short-distance wireless transmission module 960, a processor 970 including one or more processing cores, and a power supply 980. A person skilled in the art may understand that the structure of a multimedia playback device shown in FIG. 9 does not constitute a limitation to the multimedia playback device, and the multimedia playback device may include more components or fewer components than those shown in the figure, or some components may be combined, or a different component deployment may be used.

The memory 910 may be configured to store a software program and a module. For example, the memory 910 may be configured to store a software program of video playback, a software program of countdown, or a software program of recognizing information sent by a server or a mobile device, or may be configured to store a binding relationship between the multimedia playback device and the mobile device, a pre-stored instruction related to a remote control device, a preset decoding instruction for decoding a signal transmitted by the remote control device, or the like. The processor 970 performs various functional applications and data processing by running the software program and module that are stored in the memory 910. The memory 910 may mainly include a program storage area and a data storage area. The program storage area may store an operating system, an application program required by at least one function (such as a video playback function, an image display function, and a touch screen recognition function), and the like. The data storage area may store data created according to use of the terminal 900, and the like. In addition, the memory 910 may include a high speed random access memory, or may include a non-volatile memory such as at least one magnetic disk storage device, a flash memory, or another volatile solid-state storage device. Correspondingly, the memory 910 may include a memory controller, to provide access of the processor 970 and the signal receiving unit 920 to the memory 910.

The signal receiving unit 920 may be configured to receive a signal transmitted by a remote control device. Specifically, after receiving the signal transmitted by the remote control device, the signal receiving unit 920 sends the signal to the processor 970. The processor 970 decodes the signal in the preset decoding manner stored in the memory.

The display unit 930 may be configured to display an obtained video stream, displayed information obtained from the server, or the like. The display unit 930 may include a display panel 931. Optionally, the display panel 931 may be configured by using a liquid crystal display (LCD), an organic light-emitting diode (OLED), or the like.

The networking unit 940 may perform networking with the server, so as to obtain a related video stream or other information from the server.

The audio circuit 950, a speaker 951, and a microphone 952 may provide audio interfaces between the user and the terminal 900. The audio circuit 950 may convert received audio data into an electric signal and transmit the electric signal to the speaker 951. The speaker 951 converts the electric signal into a sound signal for output. On the other hand, the microphone 952 converts a collected sound signal into an electric signal. The audio circuit 950 receives the electric signal and converts the electric signal into audio data, and outputs the audio data to the processor 970 for processing. Then, the processor 970 outputs the audio data to the memory 910 for further processing. The audio circuit 950 may further include an earplug jack, to provide communication between a peripheral earphone and the terminal 900.

The short-distance wireless transmission module 960 may be a wireless fidelity (WiFi) module, a Bluetooth module, or the like. The terminal 900 may help, by using the short-distance wireless communications module 960, the user receive and send e-mails, browse a web page, access streaming media, and so on, which provides wireless broadband Internet access for the user. Although FIG. 9 shows the short-distance wireless transmission module 960, it may be understood that the short-distance wireless transmission module is not a necessary component of the terminal 900, and when required, may be omitted as long as the scope of the essence of the present disclosure is not changed.

The processor 970 is the control center of the terminal 900, and is connected to various parts of the mobile multimedia playback device by using various interfaces and lines. By running or executing the software program and/or module stored in the memory 910, and invoking data stored in the memory 910, the processor 970 performs various functions and data processing of the terminal 900, thereby performing overall monitoring on the mobile multimedia playback device. Optionally, the processor 970 may include the one or more processing cores. Optionally, the processor 970 may integrate an application processor and a modem. The application processor mainly processes an operating system, a user interface, an application program, and the like. The modem mainly processes wireless communication. It may be understood that the foregoing modem may not be integrated into the processor 970.

The terminal 900 further includes the power supply 980 (such as a battery) for supplying power to the components. Preferably, the power supply may be logically connected to the processor 970 by using a power management system, thereby implementing functions such as charging, discharging, and power consumption management by using the power management system. The power supply 980 may further include any component such as one or more direct-current or alternating current power supplies, a recharge system, a power-supply failure detection circuit, a power-supply converter, an inverter, or a power state indicator.

Although not shown in the figure, the terminal 900 may further include a camera, a Bluetooth module, a universal serial bus (USB) jack, video signal interfaces: a VGA, a DVI, and an HDMI that are connected to a set-top box, and the like, and details are not described herein. In the embodiments of this application, the set-top box and a smart television are used as a whole and become the multimedia playback device referred to in this application.

One or more programs stored in the memory 910 are configured to be executed by one or more processors.

When the terminal 900 is a first terminal, the foregoing one or more programs include instructions for performing the following operations:

displaying a subject matter editing interface, the subject matter editing interface including an editing item used for editing subject matter content; obtaining a target user selected according to the editing item, and performing combination according to the target user and content edited by using another editing item, to obtain a subject matter message; and sending the subject matter message to a server, the subject matter message being used for triggering the server to send the subject matter message to the target user.

Optionally, the one or more programs further include instructions for performing the following operations:

presenting a subject matter editing entrance in an application program; and displaying the subject matter editing interface after the subject matter editing entrance is triggered.

Optionally, the one or more programs further include instructions for performing the following operations:

displaying a notification manner selection control after an editing item in the subject matter editing interface that is used for setting a notification manner is triggered; and obtaining a notification manner that is set according to the notification manner selection control, the notification manner including at least one of an SMS message, a call, and an instant messaging message; and displaying a file directory after an editing item in the subject matter editing interface that is used for adding a file is triggered, the file directory being used for selecting at least one file needing to be added, and the file directory including at least one of a local file directory and a cloud file directory.

Optionally, the editing item includes at least one of an editing item used for entering text information, an editing item used for adding a file, an editing item used for recording audio or a video, and an editing item used for adding a target user.

Optionally, the one or more programs further include instructions for performing the following operations:

displaying a sending-time setting control after a sending control used for guiding to send the subject matter message is triggered; and sending, to the server, the subject matter message and the sending time that is set according to the sending-time setting control, the sending time being used for triggering the server to send the subject matter message to the target user at the sending time.

Optionally, the one or more programs further include an instruction for performing the following operation:

displaying a group member list of a group after an editing item in the subject matter editing interface that is used for adding a target user is triggered, the group member list being used for selecting a target user needing to pay attention to the subject matter message.

Optionally, the one or more programs further include an instruction for performing the following operation:

forming the subject matter message according to the target user, a group identifier, and the content edited by using the another editing item, the subject matter message being used for triggering the server to: send the subject matter message to clients to which member users in the group log in, and notify the target user to pay attention to the subject matter message.

Optionally, the one or more programs further include an instruction for performing the following operation:

presenting the subject matter editing entrance in a group chat interface that is opened in the application program.

Optionally, the one or more programs further include instructions for performing the following operations:

receiving a recall instruction of recalling a selected subject matter message that has been sent, and sending, to the server, a recall message for instructing to recall the selected subject matter message, the recall message being used for triggering the server to: instruct a receive client of the subject matter message to recall displaying of the subject matter message, and return a recall result to the transmit client after the receive client successfully recalls the displaying of the subject matter message.

When the terminal 900 is a second terminal, the foregoing one or more programs include instructions for performing the following operations: receiving a subject matter message sent by a server, the subject matter message being obtained by a transmit client by means of combination according to editing items in a subject matter editing interface that are used for editing subject matter content, and being sent to a server; parsing the subject matter message; and displaying brief content of the subject matter message, the brief content including at least text content related to the subject matter message.

Optionally, the one or more programs further include instructions for performing the following operations:

parsing the subject matter message, to obtain a group identifier corresponding to the subject matter message; and displaying the brief content of the subject matter message in the chat message form in a group chat interface having the group identifier.

Optionally, the one or more programs further include instructions for performing the following operations:

detecting whether the subject matter message includes a confirmation tag, the confirmation tag being used for indicating that a user logging in to the receive client is a user that is specified by the transmit client and that needs to pay attention to the subject matter message; performing attention prompt tagging on the subject matter message displayed in a subject matter message display list when the subject matter message includes the confirmation tag; and displaying a confirmation control on the brief content of the subject matter message or on a matter display interface of the subject matter message when the subject matter message includes the confirmation tag, where the receive client may return a confirmation result to the transmit client after the confirmation control is triggered.

In an exemplary embodiment, a non-temporary computer readable storage medium including instructions, for example, a memory including instructions, is further provided. The instructions may be executed by a processor of the first terminal or the second terminal to implement the foregoing subject matter message notification method. For example, the non-temporary computer readable storage medium may be a ROM, a random access memory (RAM), a CD-ROM, a magnetic tape, a floppy disk, or an optical data storage device.

Figure 10:
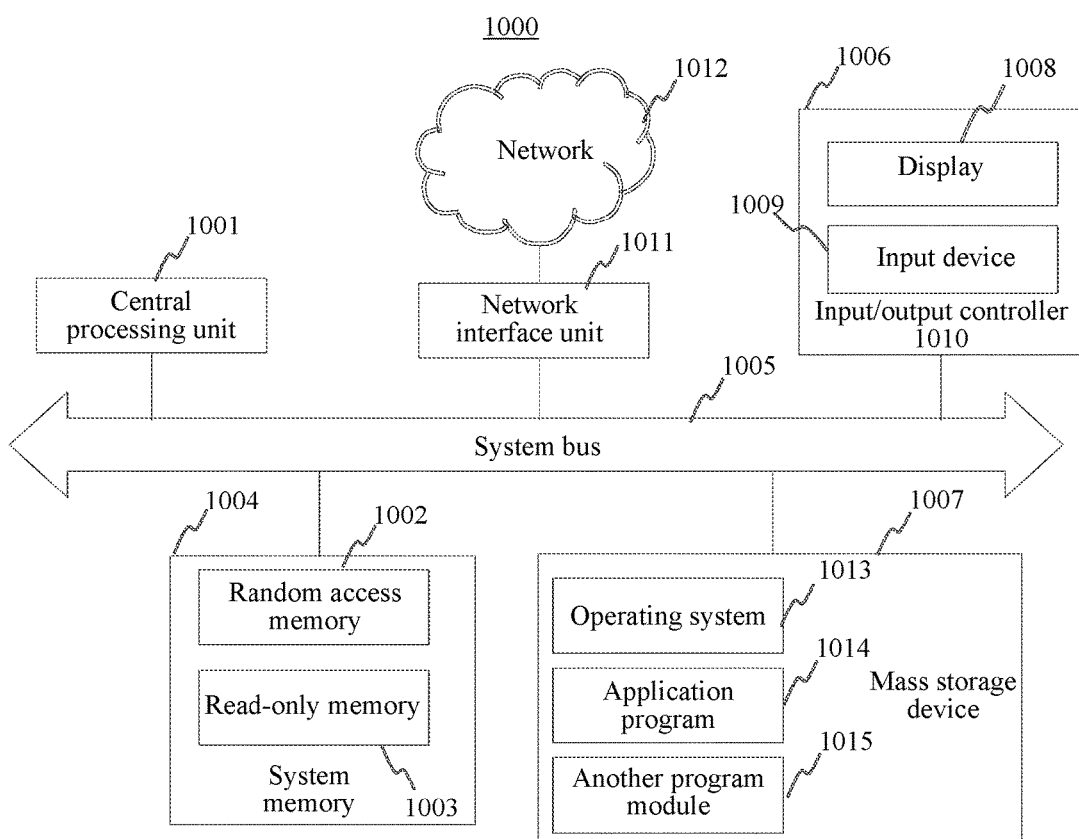
FIG. 10 is a schematic structural diagram of a server according to some embodiments of the present disclosure.

FIG. 10 is a schematic structural diagram of a server according to some embodiments of the present disclosure. Optionally, the server 1000 may be the server 120. Details are as follows.

The server 1000 includes a central processing unit (CPU) 1001, a system memory 1004 including a random access memory (RAM) 1002 and a read-only memory (ROM) 1003, and a system bus 1005 connecting the system memory 1004 and the central processing unit 1001. The server 1000 further includes a basic input/output (I/O) system 1006 helping transmit information between components in a computer, and a mass storage device 1007 configured to store an operating system 1013, an application program 1014, and another program module 1015.

The basic input/output system 1006 includes a display 1008 configured to display information and an input device 1009, such as a mouse or a keyboard, configured to input information by a user. The display 1008 and the input device 1009 are both connected to the central processing unit 1001 by using an input/output controller 1010 that is connected to the system bus 1005. The basic input/output system 1006 may further include the input/output controller 1010 configured to receive and process input from multiple other devices such as the keyboard, the mouse, or an electronic stylus. Similarly, the input/output controller 1010 further provides output to a screen, a printer, or an output device of another type.

The mass storage device 1007 is connected to the central processing unit 1001 by using a mass storage controller (not shown) that is connected to the system bus 1005. The mass storage device 1007 and a computer readable medium associated with the mass storage device 1007 provide non-volatile storage for the server 1000. That is, the mass storage device 1007 may include a non-transitory computer readable medium (not shown) such as a hard disk or a CD-ROM drive.

Generally, the computer readable medium may include a computer readable storage medium and a communications medium. The computer storage medium includes a volatile or non-volatile, removable or non-removable medium implemented by using any method or technology for storing information such as a computer readable instruction, a data structure, a program module, or other data. The computer storage medium includes a static random access memory (SRAM), an electrically erasable programmable read-only memory (EEPROM), an erasable programmable read only memory (EPROM), a programmable read only memory (PROM), a RAM, a ROM, a flash memory or other solid-state storage and technologies, a CD-ROM, a digital versatile disc (DVD) or other optical storage, a cassette, a magnetic tape, magnetic disk storage or other magnetic storage devices, or the like. Certainly, a person skilled in the art may know that the computer storage medium is not limited to the foregoing types. The foregoing system memory 1004 and the mass storage device 1007 may be collectively referred to as a memory.

According to the embodiments of the present disclosure, the server 1000 may be further connected, by using a network such as Internet, to a remote computer on the network to run. That is, the server 1000 may be connected to a network 1012 by using a network interface unit 1011 that is connected to the system bus 1005, or may be connected to a network of another type or a remote computer system (not shown) by using the network interface unit 1011.

The memory further includes one or more programs configured to be executed by one or more processors. The one or more programs include instructions for performing the following operations:

receiving a subject matter message sent by a transmit client; parsing the subject matter message to obtain a target user, the target user being a user that is selected by the transmit client and that needs to pay attention to the subject matter message; and sending the subject matter message to the target user, and instructing the target user to pay attention to the subject matter message.

Optionally, the one or more programs further include instructions for performing the following operations:

parsing the subject matter message to obtain the group identifier; determining a group having the group identifier; and sending the subject matter message to clients to which members in the group log in, and instructing the target user to pay attention to the subject matter message.

Optionally, the one or more programs further include instructions for performing the following operations:

adding a confirmation tag to the subject matter message that is to be sent to the target user, the confirmation tag being used for prompting the target user to pay attention to the subject matter message; sending, to a client to which the target user logs in, the subject matter message added with the confirmation tag; and sending, to a client to which another user in the group logs in, the subject matter message not added with the confirmation tag.

Optionally, the one or more programs further include instructions for performing the following operations:

receiving a recall message that is used for recalling the subject matter message and that is sent by the transmit client; sending a recall notification to a receive client of the subject matter message, the recall notification being used for triggering the receive client to: recall displaying of the subject matter message, and return a recall result; and feeding back the recall result to the transmit client after receiving the recall result sent by the receive client.

In an exemplary embodiment, a non-temporary computer readable storage medium including instructions, for example, a memory including instructions, is further provided. The instructions may be executed by a processor of the server to implement the foregoing subject matter message notification method. For example, the non-temporary computer readable storage medium may be a ROM, a random access memory (RAM), a CD-ROM, a magnetic tape, a floppy disk, or an optical data storage device.

The sequence numbers of the foregoing embodiments of the present disclosure are merely for the convenience of description, and do not imply the preference among the embodiments.

A person of ordinary skill in the art may understand that all or some of the steps of the foregoing embodiments may be implemented by using hardware, or may be implemented by a program instructing relevant hardware. The program may be stored in a non-transitory computer readable storage medium. The storage medium may be a read-only memory, a magnetic disk, an optical disc, or the like.

What is described above is merely an example of the embodiments of the present disclosure, and is not intended to limit the present disclosure. Any modifications, equivalent variations, and improvements made in accordance with the spirits and principles of the present disclosure shall fall within the protection scope of the present disclosure.

What is claimed is:

1. An event message notification method performed at a terminal having one or more processors and memory storing one or more programs to be executed by the one or more processors, the method comprising:
    displaying a group chat interface in an instant messaging application, the group chat interface including an affordance for opening an event message editing interface;
    in response to detecting a triggering event associated with the affordance:
        displaying the event message editing interface, the event message editing interface including an editing item used for editing event content, an editing item used for adding a target user, and an editing item used for adding a file;
        generating an event message in accordance with user-provided event content through the editing item used for editing the event content, one or more user-selected target users selected from participants of the group chat through the editing item used for adding a target user, and one or more user-selected files through the editing item used for adding a file;
        adding a confirmation tag to the generated event message to indicate that only the user-selected target users are prompted to instantly view and confirm receipt of the event message;
        sending the event message and the confirmation tag to a server, wherein the server performs steps including:
            sending, by the server, the event message with a prompting tag corresponding to the confirmation tag to only the user-selected target users so that the user-selected target users are prompted to instantly view and confirm receipt of the event message; and
            sending, by the server, the event message without the prompting tag to participants other than the user-selected target users in the group chat; and
            receiving, by the server, acknowledgement notifications from each of the user-selected target users, wherein a respective acknowledgement notification is received by the server from a corresponding user-selected target user after the corresponding user-selected target user opens and acknowledges receipt of the event message; and
        receiving, by the terminal from the server, a notification indicating all the user-selected target users have opened and acknowledged the receipt of the event message.

2. The method according to claim 1, wherein the event message is a read-only message for the one or more user-selected target users.

3. The method according to claim 1, wherein the event message editing interface further includes an editing item used for setting a notification manner, the method further comprising:
    displaying a notification manner selection control in accordance with a user selection of the editing item used for setting a notification manner; and
    obtaining a notification manner that is set according to the notification manner selection control for the one or more user-selected target users, the notification manner comprising at least one of an SMS message, a call, and an instant messaging message.

4. The method according to claim 3, wherein there are at least two different notification manners assigned to the one or more user-selected target users.

5. The method according to claim 1, further comprising:
    displaying a file directory in accordance with a user selection of the editing item used for adding a file, the file directory being used for selecting at least one file needing to be added, and the file directory comprising at least one of a local file directory and a cloud file directory.

6. The method according to claim 1, wherein the sending the event message to a server comprises:
displaying a sending-time setting control after a sending control used for guiding to send the event message is triggered; and
sending, to the server, the event message and the sending time that is set according to the sending-time setting control, the sending time being used for triggering the server to send the event message to the target user at the sending time.

7. The method according to claim 1, further comprising:
prior to receiving the notification from the server indicating all the user-selected target users have opened and acknowledged the receipt of the event message:
receiving an acknowledgement from at least one of the user-selected target users; and
updating a status of the corresponding target user in accordance with the acknowledgement.

8. A terminal, comprising:
one or more processors;
memory; and
one or more programs stored in the memory, the one or more programs being configured to be executed by the one or more processors and cause the first terminal to perform a plurality of operations including:
displaying a group chat interface in an instant messaging application, the group chat interface including an affordance for opening an event message editing interface;
in response to detecting a triggering event associated with the affordance:
displaying the event message editing interface, the event message editing interface including an editing item used for editing event content, an editing item used for adding a target user, and an editing item used for adding a file;
generating an event message in accordance with user-provided event content through the editing item used for editing the event content, one or more user-selected target users selected from participants of the group chat through the editing item used for adding a target user, and one or more user-selected files through the editing item used for adding a file;
adding a confirmation tag to the generated event message to indicate that only the user-selected target users are prompted to instantly view and confirm receipt of the event message;
sending the event message and the confirmation tag to a server, wherein the server performs steps including:
sending, by the server, the event message with a prompting tag to only the user-selected target users so that the user-selected target users are prompted to instantly view and confirm receipt of the event message; and
sending, by the server, the event message without the prompting tag to participants other than the user-selected target users in the group chat; and
receiving, by the server, acknowledgement notifications from each of the user-selected target users, wherein a respective acknowledgement notification is received by the server from a corresponding user-selected target user after the corresponding user-selected target user opens and acknowledges receipt of the event message; and
receiving, by the terminal from the server, a notification indicating all the user-selected target users have opened and acknowledged the receipt of the event message.

9. The terminal according to claim 8, wherein the event message editing interface further includes an editing item used for setting a notification manner, the method further comprising:
displaying a notification manner selection control in accordance with a user selection of the editing item used for setting a notification manner; and
obtaining a notification manner that is set according to the notification manner selection control for the one or more user-selected target users, the notification manner comprising at least one of an SMS message, a call, and an instant messaging message.

10. The terminal according to claim 8, wherein the plurality of operations further comprise:
displaying a file directory in accordance with a user selection of the editing item used for adding a file, the file directory being used for selecting at least one file needing to be added, and the file directory comprising at least one of a local file directory and a cloud file directory.

11. The terminal according to claim 8, wherein the sending the event message to a server comprises:
displaying a sending-time setting control after a sending control used for guiding to send the event message is triggered; and
sending, to the server, the event message and the sending time that is set according to the sending-time setting control, the sending time being used for triggering the server to send the event message to the target user at the sending time.

12. The terminal according to claim 8, wherein the plurality of operations further comprise:
prior to receiving the notification from the server indicating all the user-selected target users have opened and acknowledged the receipt of the event message:
receiving an acknowledgement from at least one of the user-selected target users; and
updating a status of the corresponding target user in accordance with the acknowledgement.

13. A non-transitory computer readable storage medium, configured to store one or more programs that, when executed by one or more processors of a terminal, cause the terminal to perform a plurality of operations including:
displaying a group chat interface in an instant messaging application, the group chat interface including an affordance for opening an event message editing interface;
in response to detecting a triggering event associated with the affordance:
displaying the event message editing interface, the event message editing interface including an editing item used for editing event content, an editing item used for adding a target user, and an editing item used for adding a file;
generating an event message in accordance with user-provided event content through the editing item used for editing the event content, one or more user-selected target users selected from participants of the group chat through the editing item used for adding a target user, and one or more user-selected files through the editing item used for adding a file; and adding a confirmation tag to the generated event message to indicate that only the user-selected target users are prompted to instantly view and confirm receipt of the event message;

sending the event message and the confirmation tag to a server, wherein the server performs steps including:

sending, by the server, the event message with a prompting tag corresponding to the confirmation tag to only the user-selected target users so that the user-selected target users are prompted to instantly view and confirm receipt of the event message; and sending, by the server, the event message without the prompting tag to participants other than the user-selected target users in the group chat; and receiving, by the server, acknowledgement notifications from each of the user-selected target users, wherein a respective acknowledgement notification is received by the server from a corresponding user-selected target user after the corresponding user-selected target user opens and acknowledges receipt of the event message; and receiving, by the terminal from the server, a notification indicating all the user-selected target users have opened and acknowledged the receipt of the event message.

14. The non-transitory computer readable storage medium according to claim 13, wherein the event message editing interface further includes an editing item used for setting a notification manner, the method further comprising:

displaying a notification manner selection control in accordance with a user selection of the editing item used for setting a notification manner; and obtaining a notification manner that is set according to the notification manner selection control for the one or more user-selected target users, the notification manner comprising at least one of an SMS message, a call, and an instant messaging message.

15. The non-transitory computer readable storage medium according to claim 13, wherein the plurality of operations further comprise:

displaying a file directory in accordance with a user selection of the editing item used for adding a file, the file directory being used for selecting at least one file needing to be added, and the file directory comprising at least one of a local file directory and a cloud file directory.

16. The non-transitory computer readable storage medium according to claim 13, wherein the sending the event message to a server comprises:

displaying a sending-time setting control after a sending control used for guiding to send the event message is triggered; and sending, to the server, the event message and the sending time that is set according to the sending-time setting control, the sending time being used for triggering the server to send the event message to the target user at the sending time.

17. The non-transitory computer readable storage medium according to claim 13, wherein the plurality of operations further comprise:

prior to receiving the notification from the server indicating all the user-selected target users have opened and acknowledged the receipt of the event message:

receiving an acknowledgement from at least one of the plurality of user-selected target users; and updating a status of the corresponding target user in accordance with the acknowledgement.

\* \* \* \* \*